United States Patent
Ito et al.

(10) Patent No.: US 7,118,687 B2
(45) Date of Patent: Oct. 10, 2006

(54) PHOSPHOR, METHOD FOR PRODUCING PHOSPHOR AND ITS PRECURSOR, AND DISPLAY DEVICE

(75) Inventors: Satoshi Ito, Hino (JP); Naoko Furusawa, Hino (JP); Hisatake Okada, Hino (JP); Hideki Hoshino, Hino (JP)

(73) Assignee: Konica Corporation, Tokyo (JP)

( * ) Notice: Subject to any disclaimer, the term of this patent is extended or adjusted under 35 U.S.C. 154(b) by 161 days.

(21) Appl. No.: 10/618,144

(22) Filed: Jul. 10, 2003

(65) Prior Publication Data

US 2004/0017154 A1   Jan. 29, 2004

(30) Foreign Application Priority Data

Jul. 24, 2002 (JP) .............................. 2002-215026
Feb. 14, 2003 (JP) .............................. 2003-036971

(51) Int. Cl.
*C09K 11/59* (2006.01)

(52) U.S. Cl. .................... 252/301.4 F; 252/301.6 F

(58) Field of Classification Search ........ 252/301.4 F, 252/301.6 F
See application file for complete search history.

(56) References Cited

U.S. PATENT DOCUMENTS

| | | | | |
|---|---|---|---|---|
| 3,541,019 A | * | 11/1970 | Gordon et al. | ........ 252/301.6 F |
| 5,518,655 A | * | 5/1996 | Morell et al. | ......... 252/301.4 R |
| 5,611,961 A | * | 3/1997 | Forster et al. | ......... 252/301.6 F |
| 5,985,176 A | * | 11/1999 | Rao | ..................... 252/301.6 F |
| 6,039,894 A | * | 3/2000 | Sanjurjo et al. | ...... 252/301.4 R |
| 6,180,029 B1 | * | 1/2001 | Hampden-Smith et al. | .......... 252/301.4 R |
| 6,576,156 B1 | * | 6/2003 | Ratna et al. | ........... 252/301.4 R |

FOREIGN PATENT DOCUMENTS

| | | |
|---|---|---|
| JP | 03-149286 | 6/1991 |
| JP | 04-008793 | 1/1992 |
| JP | 9-278446 | 10/1997 |
| JP | 2000-096048 | 4/2000 |
| JP | 2000-297279 | 10/2000 |
| JP | 2001-17266 | 6/2001 |
| JP | 2003-082346 | 3/2003 |
| JP | 2003-089517 | 3/2003 |
| WO | WO 00/71636 | * 11/2000 |
| WO | WO 01/90275 | 11/2001 |

* cited by examiner

*Primary Examiner*—C. Melissa Koslow

(57) ABSTRACT

A precursor of a silicate phosphor is formed by mixing a silicon system liquid material, in which a silicon system material is dispersed in a liquid, with a metal system liquid material including a metallic element, and the silicate phosphor is obtained by calcining the obtained precursor.

9 Claims, 6 Drawing Sheets

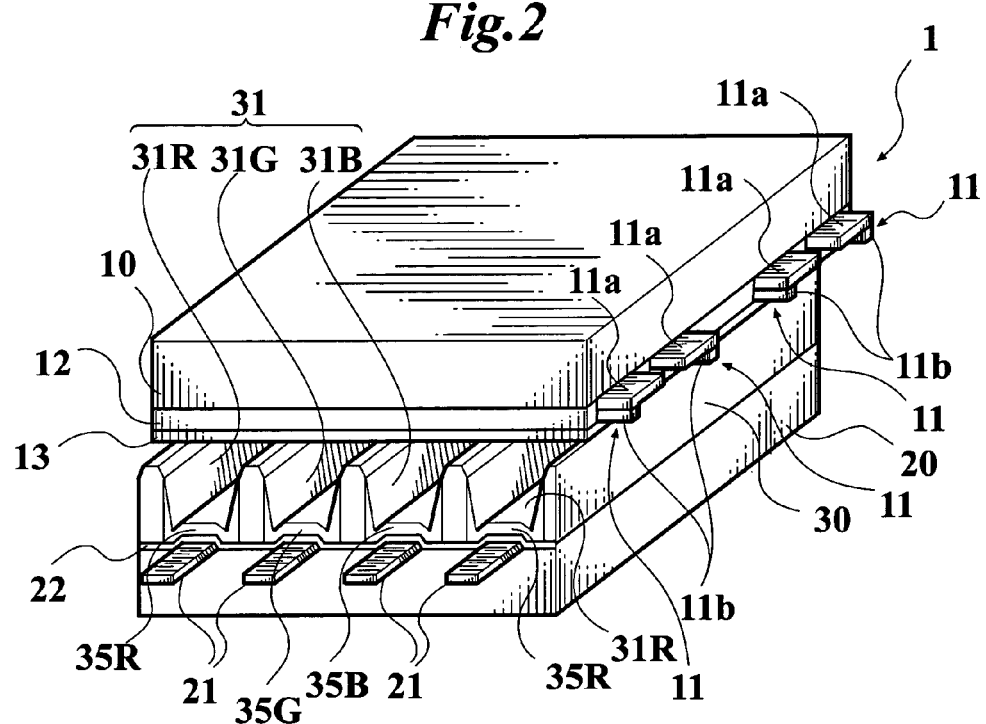
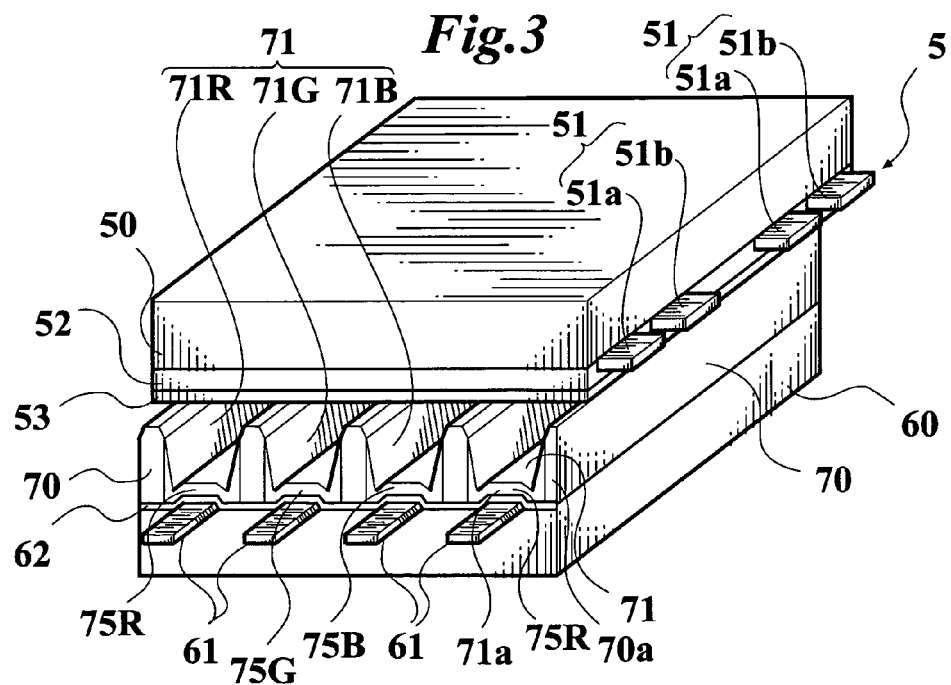

PHOSPHOR, METHOD FOR PRODUCING PHOSPHOR AND ITS PRECURSOR, AND DISPLAY DEVICE

BACKGROUND OF THE INVENTION

1. Field of the Invention

The present invention relates to a phosphor, particularly, a silicate phosphor capable of being widely used for a display device such as plasma display panel or the like, to devices of lighting systems and the like such as thin tube type fluorescent lamp and the like, electronic device and various articles using phosphors, to a method for producing the phosphor and its precursor, and to a display device.

2. Description of Related Art

A phosphor is a material for converting the energy of an exciting line (ultraviolet ray, visible light, infrared ray, heat ray, electron ray, X-ray, radioactive ray or the like) into a light (ultraviolet ray, visible light, infrared ray or the like) by irradiating the exciting line. Phosphors are used for various articles such as fluorescent paints, ashtrays, stationeries, outdoor products, guide plates, inducing materials, indicators such as safety signs and the like, and the like. Besides the above, phosphors are also used for various devices such as electron tubes, fluorescent display tubes, electroluminescence panels, scintillation detectors, X-ray image intensifiers, thermoluminescence dosimeters, imaging plates and the like, and for display devices such as field emission display (FED), plasma display panel (PDP) and the like (See for example, "Phosphor Handbook", Phosphor Research Society Edition, Ohmsha, Ltd.).

Among the above-described display devices, particularly, the PDP is capable of making a screen large and thin, and thereby, it attracts attention as a flat-panel display which can take the place of a cathode-ray tube (CRT). A PDP has two glass substrates comprising electrodes, and a number of micro discharge cells (hereinafter, referred to as "cells") formed by partition walls provided between the substrates. On the side face and the bottom face of a partition wall which surrounds each cell (one glass substrate), a phosphor layer that emits a light of red, green, blue or the like is provided. Each cell is formed in a predetermined shape by the partition walls, arranged regularly on the substrate, and discharge gas using Xe, Ne or the like as principal component is charged therein. The cell is for suppressing spread of discharge in a certain region. When voltage is applied between the electrodes, an ultraviolet ray due to the discharge gas is generated, and thereby, the phosphors are excited and emit a visible light. Desired information can be displayed in full color by selectively discharging the cell or a part of the cell.

Presently, as phosphors mainly used for a PDP, there are $(Y, Gd)BO_3:Eu$ (Red), $Zn_2SiO_4:Mn$ (Green), $BaMgAl_{10}O_{17}:Eu$ (Blue) and the like. These phosphors are generally produced by a solid phase method. The solid phase method is a method for obtaining a phosphor according to a solid phase reaction by mixing a predetermined amount of a compound including elements forming a ground material of the phosphor with a predetermined amount of a compound including activator elements, and calcining the mixture at a predetermined temperature (See "Phosphor Handbook"). The shape of individual particle of the phosphor obtained according to such a method is usually flat shape or irregular multifaceted shape.

Incidentally, with displays such as PDP and the like, improvement of brightness, smooth movie display and the like are required. Thereby, it is considered to improve the luminescence intensity of phosphors in order to enhance the brightness. Particularly, a green phosphor has high visibility, so that it is important to enhance the luminescence intensity of the green phosphor in order to improve the white brightness. On the other hand, in order to achieve smooth movie display, information has to be displayed in sequence per extremely short unit of time, so that phosphors having short persistence time are required.

However, the above-described silicate phosphor such as $Zn_2SiO_4:Mn$ (Green) or the like has a long persistence time, so that there is a possibility that it generates afterimage or flickering of image, or the like when the next new information is displayed. Therefore, as for the silicate phosphor such as $Zn_2SiO_4:Mn$ or the like, it is required to improve the luminescence intensity, and moreover, to reduce the persistence time thereof.

Then, it is considered to improve the luminescence intensity, and moreover, to reduce the persistence time by producing $Zn_2SiO_4:Mn$ having high purity. However, with the solid phase method in earlier technology, since it is solid phase reaction, there remain nonreactive excessive impurities, excess soluble salts generated by reaction, and the like. Therefore, it is difficult to obtain a phosphor having stoichiometrically high purity. Furthermore, although the luminescence intensity, the persistence time or the like of an inorganic phosphor can be generally controlled by changing the amount of activators, with the solid phase method, it is difficult to properly control the amount of these in the composition.

Further, recently, along with achievement of higher definition of a display such as PDP or the like, cells have been miniaturized. In order to obtain predetermined brightness, not less than a certain amount of phosphors must be filled in every phosphor layer provided in each cell. However, if the particle shape is flat shape or irregular multifaceted shape as mentioned above, the phosphor layers become thick by that shape. When the thickness of the phosphor layers is thick, not only scattering of lights emitted from the phosphors become large, but also the discharge space becomes narrow, so that it becomes impossible to generate an ultraviolet ray sufficient to excite the phosphors. As mentioned before, particularly, the green phosphor has high visibility, so that it is required to improve the brightness of green cells.

Therefore, in order to fill up a green phosphor in a phosphor layer thickly, for instance, a spherical phosphor $(Zn_2SiO_4:Mn)$ is produced by using spherical or approximately spherical polymethylsilsesquioxane as a base substance (for example, see Japanese Patent Application Laid-Open Publication No. 9-278446; hereinafter, referred to as Patent Document 1).

However, although finer phosphor particles are required in accordance with the miniaturization of the cell structure of a PDP, only a method of obtaining a spherical phosphor which has comparatively large particle size (4.5 μm to 2 μm) according to the solid phase method is disclosed in Patent Document 1. Since the method disclosed in Patent Document 1 is the solid phase method, it is required to perform a step such as crushing or the like when producing phosphor of finer particles. Therefore, there is a possibility that the shape of the phosphor particles becomes not uniform. Further, there is a case such that crystal distortion occurs at the time of crushing, and thereby that the luminescence intensity deteriorates. Furthermore, since powders as raw materials are mixed according to a dry system, it is difficult to control the composition of constituting elements uniform. Therefore, it is difficult to diffuse and mix activators uniformly in center nuclei particles of phosphors, so that there is a possibility that sufficient luminescence intensity cannot be obtained.

SUMMARY OF THE INVENTION

An object of the present invention is to provide a phosphor of fine particles having a uniform shape, high luminescence intensity and no luminescence unevenness, to a method for producing the phosphor and its precursor, and to a display device in which the phosphor is used.

Another object of the present invention is to provide a phosphor having high luminescence intensity and short persistence time, to a method for producing the phosphor and its precursor, and to a display device in which the phosphor is used.

In order to achieve the above-descried objects, according to a first aspect of the present invention, the silicate phosphor of the present invention comprises: a silicon system material having particles which form center nuclei of the phosphor; and a metallic element, which is capable of forming the silicate phosphor by calcining, dispersed and mixed in each of the particles of the silicon system material, wherein a mean particle size of the phosphor is from 0.01 to 1 µm, and particles of the phosphor are not fused together.

According to the phosphor of the present invention, the metallic element is dispersed and mixed in the silicon system material whose particles form the center nuclei of the phosphor, and the particles of the phosphor are not in an indefinite shape such that the particles are fused together. Therefore, it is not required to perform mechanical crushing treatment or the like for making the particles of the phosphor in a constant size and constant shape, so that deterioration of the luminescence intensity according to crystal defects can be prevented. Thereby, the phosphor of the present invention can be suitably used to various use.

Furthermore, the mean particle size is from 0.01 to 1 µm, which is extremely fine particle, and the shapes of the particles are equal. Therefore, the phosphor can also be filled thickly in a phosphor layer of a PDP, in which miniaturization of the cell structure has been proceeding, and the luminescence intensity of the cells can be improved.

Further, according to a second aspect of the present invention, the silicate phosphor of the present invention comprises: a silicon system material having particles which form center nuclei of the phosphor; and a metallic element, which is capable of forming the silicate phosphor by calcining, dispersed and mixed in each of the particles of the silicon system material, wherein a mean particle size of the phosphor is from 0.01 to 1 µm, a value of a coefficient of variation of particle size distribution is not more than 40%, and a shape of individual particle of the phosphor is approximately equal.

According to the phosphor of the present invention, it is a phosphor of extremely fine particles that the mean particle size is from 0.01 to 1 µm, and the coefficient of variation of particle size distribution is not more than 40%, which is a small value. Further, the size and shape are approximately equal among the particles, so that it is possible to emit a light having high brightness and no unevenness when using the phosphor in any use. Further, the phosphor can be filled thickly in a phosphor layer provided to the cells of a PDP, so that the luminescence intensity of the cells can be improved.

In the phosphor of the first and second aspects of the present invention, a number of particles having uniform composition distribution of constituting elements in the particles of the phosphor is preferable to be not less than 50%.

Thus, since the number of particles having uniform composition distribution of constituting elements in the particles of the phosphor is not less than 50%, the luminescence property of the particles becomes uniform. Therefore, a graceful PDP without luminescence unevenness can be obtained by forming a phosphor layer of the cells of the PDP with this phosphor.

Further a coefficient of variation of inter-particle distribution of content of each constituting element in the particles of the phosphor is preferable to be not more than 50%.

Thus, since the coefficient of variation of inter-particle distribution of content of each constituting element in the particles of the phosphor is not more than 50%, there is no variation in the amount of the constituting elements contained in each particle, so that it is possible to emit a light without unevenness.

Further, according to a third aspect of the present invention, the method for producing a precursor of a silicate phosphor of the present invention, comprises: a precursor forming step for forming the precursor of the phosphor by mixing a silicon system liquid material, in which a silicon system material is dispersed in a liquid, with a metal system liquid material including a metallic element which forms the silicate phosphor with the silicon system material by calcining. Here, as the silicon system material, wet silica is preferable. Furthermore, the wet silica is preferable to be colloidal silica particularly.

According to the method for producing the precursor of the phosphor of the present invention, the precursor of the phosphor is formed in a liquid phase (liquid phase method) by mixing a silicon system liquid material, in which a silicon system material is dispersed in a liquid, with a metal system liquid material including a metallic element which forms the silicate phosphor with the silicon system material by calcining. Thereby, a precursor having stoichiometically high purity and uniform composition can be formed.

Furthermore, according to a fourth aspect of the present invention, the method for producing a silicate phosphor of the present invention, comprises: the precursor forming step in the above-described third aspect; and a calcining step for obtaining the phosphor by calcining the precursor obtained in the precursor forming step.

According to the method for producing the phosphor of the present invention, the precursor of the phosphor is formed in a liquid phase (liquid phase method) by mixing a silicon system liquid material, in which a silicon system material is dispersed in a liquid, with a metal system liquid material including a metallic element which forms the silicate phosphor with the silicon system material by calcining. Thereby, a precursor having stoichiometically high purity and uniform composition can be formed. As a result, the phosphor obtained after calcining can be the one having uniform composition and high purity, so that it becomes an excellent phosphor having high luminescence intensity and short persistence time.

When a precursor is formed by the liquid phase method, the silicon system material and the metallic element except silicon, which forms the silicate phosphor, can be mixed uniformly in the liquid, and the constituting elements are dispersed and distributed uniformly in the particles by setting the reaction conditions. Thereby, a phosphor having uniform content of the constituting elements can be obtained.

In the method for producing the phosphor of the present invention, the silicon system material may be silicon dioxide.

An excellent phosphor having higher luminescence intensity and short persistence time can be obtained by producing a silicate phosphor by using silicon dioxide. Further, a BET specific surface area of the silicon system material is preferable to be not less than 50 m$^2$/g.

Further, preferably, the metallic element is selected at least one from the group consisting of Zn, Mn, Mg, Ca, Sr, Ba, Y, Zr, Al, Ga, La, Ce, Eu and Tb.

A silicate phosphor having aimed luminescence can be obtained by mixing the silicon system liquid material and the metal system liquid material including the metallic element selected at least one from the group consisting of Zn, Mn, Mg, Ca, Sr, Ba, Y, Zr, Al, Ga, La, Ce, Eu and Tb, forming a precursor, and calcining the precursor.

Further, in the precursor forming step, a solution including a precipitant which forms a precipitate by reacting with the metallic element may be mixed. In this case, the precipitant is preferable to be organic acid or alkali hydroxide.

Furthermore, preferably, the silicon system material is prepared beforehand.

Here, to "prepare beforehand" means to prepare the dispersion state of the silicon system material in liquid beforehand to make it in a desired state.

The agglomerated particle size of the silicon system material can be controlled stably by preparing the silicon system liquid material beforehand to make the dispersion state of the silicon system material in liquid into a desired state. Thereby, the obtained precursor becomes a monodisperse one having uniform composition and narrow dispersion of particle size and the like. Accordingly, the silicate phosphor obtained after calcining can become the one having chemically high purity and more uniform particle size and the like.

Further, the liquid may be water, alcohols or a mixture of the water and the alcohols, and the metal system liquid material may include water, alcohols or a mixture of the water and the alcohols.

Preferably, the precursor forming step forms the precursor in which the metallic element is included in uniform composition around the particles of the silicon system material that become the center nuclei of the phosphor, and the calcining step performs calcining in a state that fusion of the particles of the silicon system material is not substantially occurred so as to obtain the phosphor in which the metallic element is dispersed and mixed in an inside of the particles of the silicon system material.

Accordingly, the precursor in which the metallic element is included in uniform composition around the particles of the silicon system material that become the center nuclei of the phosphor is formed in the precursor forming step, and the metallic element is dispersed and mixed in the inside of the particles of the silicon system material in the calcining step. Therefore, a phosphor having uniform composition can be obtained.

Further, when calcining the precursor, it is made in a state that fusion of the particles of the silicon system material is not substantially occurred. Thereby, the particles of the obtained phosphor can be prevented from being in an indefinite shape such that the particles are fused together. Therefore, a silicate phosphor having small coefficient of variation of particle size distribution and equal shape among the particles can be obtained.

Further, it is not required to perform a mechanical crushing treatment or the like for making the particles of the phosphor in a constant size and constant shape, so that deterioration of luminescence intensity according to crystal defects can be prevented.

More preferably, the calcining step includes: a metallic element dispersing and mixing step for calcining the precursor in a state that fusion of the particles of the silicon system material is not substantially occurred, and for dispersing and mixing the metallic element in an inside of the particles of the silicon system material; a sintering inhibitor mixing step for mixing a sintering inhibitor in a calcined product obtained in the metallic element dispersing and mixing step; and a crystallizing step for obtaining a crystallized silicate phosphor by re-calcining the calcined product obtained in the sintering inhibitor mixing step.

Thereby, the efficiency when producing a silicate phosphor can be improved. That is, in order to disperse and mix the metallic element in the silicon system material in a state that fusion of the particles of the silicon system material is not substantially occurred, calcining must be performed at a temperature not more than the melting point of the silicon system material. On the other hand, since a predetermined amount of energy is required in order to crystallize a phosphor to a desired state, calcining must be performed for a long time when calcining is performed at a low temperature. However, in the present invention, after the metallic element dispersing and mixing step, a sintering inhibitor is mixed in the obtained calcined product. Therefore, the crystallizing step can perform calcining at a calcining temperature higher than that in the metallic element dispersing and mixing step in a state that fusion of the particles are prevented. Accordingly, the efficiency for producing the phosphor can be improved.

Furthermore, in the calcining step, the precursor is preferable to be calcined at a temperature between not less than 400° C. and not more than 1400° C.

Further, according to a fifth aspect of the present invention, the phosphor of the present invention is obtained (produced) by the method in the above-describe third aspect. Further, the phosphors in the above-described first and second aspects are preferable to be produced by the method in the above-described third aspect.

According to the phosphor of the present invention, the phosphor shows an excellent property of high luminescence intensity and short persistence time. In addition, the same effects as in the above-described first and second aspects can be obtained.

Furthermore, according to a sixth aspect of the present invention, the display device of the present invention has a phosphor layer containing any one of the phosphors in the above-described first, second and fifth aspects.

In the display device of the present invention, preferably, the display device is a plasma display panel.

In detail, the plasma display panel may comprise: two substrates arranged so as to face to each other by keeping a predetermined distance; partition walls for sectioning a space between the substrates in plurality, the partition walls being provided between the substrates; and a plurality of discharge cells formed by being surrounded with the partition walls and the substrates, wherein a phosphor layer including any one of the phosphors in the above-described first, second and fifth aspects is provided in an inner side of at least one discharge cell among the plurality of the discharged cells.

According to the display device of the present invention, since the display device (for example, a PDP or the like) has a phosphor layer containing any one of the phosphors in the above-described first, second and fifth aspects, a silicate phosphor can be filled thickly in the phosphor layer. Thereby, the luminescence intensity of the cells can be improved. Further, the luminescence intensity of the phosphor layer becomes high and the persistence time becomes short. Thereby, the brightness of the display device such as a plasma display panel or the like improves, and moving images can be displayed smoothly.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 2 is a construction view schematically showing an example of a plasma display panel as a display device of the present invention;

FIG. 3 is a construction view schematically showing another example of a plasma display panel as a display device of the present invention

DETAILED DESCRIPTION OF THE INVENTION

Figure 1:
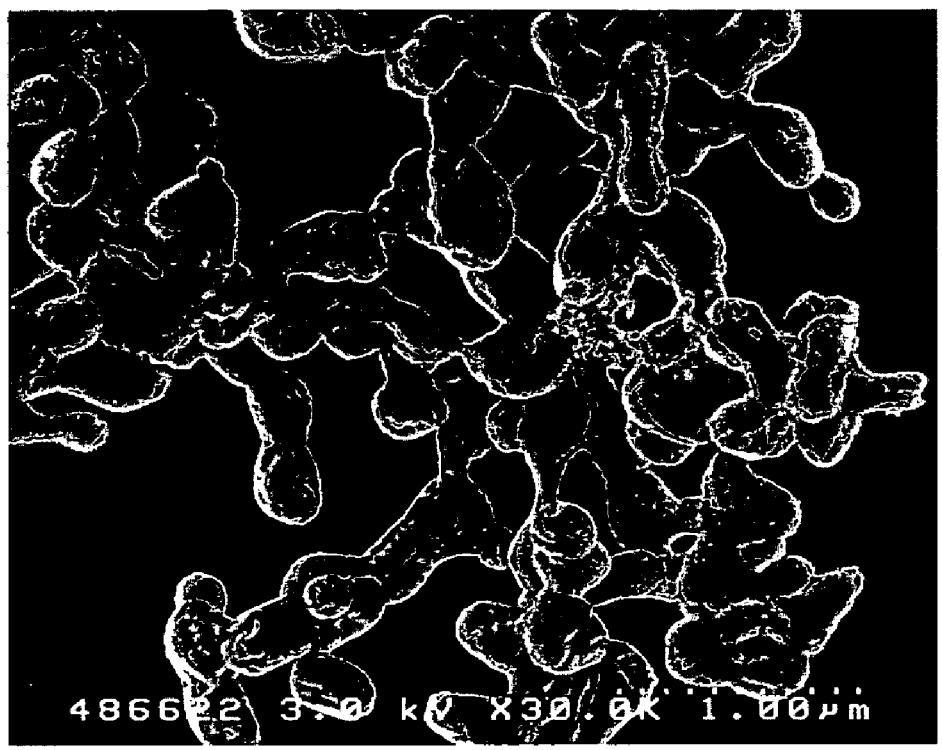
FIG. 1 is a scanning electron microscope photograph showing an example of a phosphor according to the present invention.

Hereinafter, the present invention will be explained in detail.

The phosphor of the present invention is a silicate phosphor. The silicate phosphor comprises a silicon system material having particles which become center nuclei of the phosphor; and a metallic element capable of forming the silicon phosphor by calcining (hereinafter, referred to as "metallic element"), the metallic element being disposed and mixed in the particles.

Here, the silicon system material is silicon (simple substance) or a silicon compound. Further, the center nuclei of the silicate phosphor substantially indicates the silicon system material, and are particles showing little change in particle size and shape before and after calcining.

As the above-described metallic element, for example, one or more metallic element selected from the group consisting of Zn, Mn, Mg, Ca, Sr, Ba, Y, Zr, Al, Ga, La, Ce, Eu and Tb can be given. These metallic elements can be selected appropriately depending on the composition of the silicate phosphor to be produced. For example, when producing a silicate phosphor represented with a composition formula of $Zn_2SiO_4$:Mn, Zn and Mn may be selected. A silicate phosphor having the aimed luminescence can be obtained by appropriately selecting and using these metallic elements.

As such a silicate phosphor, concretely, $Zn_2SiO_4$:Mn/(Sr, Ba)$Al_2Si_2O_8$: Eu/(Ba, Mg)$_2SiO_4$: Eu/$Y_2SiO_5$: Ce, Tb/$Sr_2Si_3O_8$-2$SrCl_2$: Eu/$Zr_2SiO_4$,$MgAl_{11}O_{19}$: Ce, Tb/$Ba_2SiO_4$: Eu/$Ca_2Y_8(SiO_4)_6O_2$:Eu and the like can be given.

The individual particle of the silicate phosphor according to the present invention are not fused together. The shape (particle shape) is approximately equal. The particle shape may be any shape such as spherical, rod-like, tabular or the like.

The mean particle size of the silicate phosphor of the present invention may be in a range of 0.01 to 3 μm, preferably, in a range of 0.01 to 1 μm, more preferably, in a range of 0.01 to 0.5 μm, and further preferably, in a range of 0.01 to 3 μm.

When the particle is a so-called normal crystal such as cube or octahedron, the mean particle size is the length of the edge of the particle. Further, when the particle is not a normal crystal, for example, when it is spherical, rod-like or tabular, the mean particle size is the diameter when considering a sphere equal to the volume of the particle.

The particles of the phosphor of the present invention are particularly preferable to be primary particles. However, they may be secondary agglomerated particles formed by agglomerating a plurality of primary particles.

Further, the particles are preferable to be monodisperse. Concretely, being monodisperse means that the value of the coefficient of variation of particle size distribution (that is, monodisperse degree) calculated by the following equation (1) is small. Concretely, the value of the coefficient of variation of the particle size distribution is preferable to be not more than 40%, more preferably, not more than 30%, and further preferably, between 0.1% and 20%

Coefficient of Variation of Particle Size Distribution=
(standard deviation of particle size/mean value
of particle size)×100       (1)

In the present invention, it is preferable that the metallic element is dispersed and mixed uniformly within the particles of the silicon system material. Concretely, the number of the particles in which composition distribution of composition of constituting elements forming the silicate phosphor is uniform is preferable to be not less than 50%, further preferably, not les than 60%, and most preferably, not less than 80%, in the particles of the silicate phosphor.

Here, the composition distribution of constituting elements in the particles being uniform means that the composition is microscopically constant in any region within each particle of phosphor. More concretely, it means that the difference of content of a composition in each slice is not more than 20% of the theoretical value of the content of the composition according to the later-described method for measuring microscopic distribution.

As a method for measuring microscopic distribution of the composition in the particles, a transmission electron microscope (TEM) is used. The characteristic X-ray generated from samples when irradiating electron rays to the samples is analyzed, and thereby, the internal composition distribution of every single particle can be measured. The particles of the silicate phosphor particles as samples are cut out continuously as slices of, for example, a thickness of approximately 50 nm. Each slice is placed on a mesh for electron microscope observation, and carbon shadowing is carried out. Thereby, observation can be performed according to the transmission method.

As a method for calculating the ratio of particles in which the composition distribution is microscopically uniform, the internal composition distribution is measured in the same manner as the above by the transmission electron microscope photograph with respect to at least 100 particles of the silicate phosphor, and the ratio of the particles in which the difference of content of a composition in each slice is not more than 20% of the theoretical value of the content of the composition may be calculated.

Furthermore, the rate of variation of inter-particle distribution of content of each constituting element in the particles is preferable to be not more than 50%, further preferably, not more than 30%, and most preferably, not more than 15%.

As a method for measuring the content of the constituting elements contained in the particles, the composition of every single particle can be measured by using a secondary ion mass spectrometry (SIMS) apparatus having high resolution of submicron to nanometer order. In this case, it is preferable to measure by placing the particles of the silicate phosphor according to the present invention on a sample support and performing carbon shadowing. Further, particularly, in case of measuring particles of the silicate phosphor particles having a particle size of not more than 1 μm, it is possible to measure by crushing the particles in a certain thickness.

The coefficient of variation of inter-particle distribution of the content of each constituting element contained in the particles can be calculated as follows. At first, the composition content when the content of the each constituting element contained in each particle of at least 100 particles of the silicate phosphor is measured by the secondary ion mass spectrometry apparatus is calculated. Then, the standard deviation of the composition content is divided by mean content. Finally, the content of each constituting element contained in the particles is calculated by multiplying the divided value by 100.

Further, as for a phosphor as one mode of the present invention, when a major axis is the direction connecting two arbitrary points a and b on the surface of a particle so that the distance between the two points a and b becomes maximum and the minor axis is the axis perpendicular to the major axis, the variations of the length of the minor axis in the major axis direction have at least two maximal values. As such a shape, for example, a shape shown in FIG. 1 can be given. Furthermore, it is considered that $SiO_2$ solid solution is formed in the inside of the phosphor. Accordingly, a phosphor having high luminescence intensity and short persistence time can be obtained.

In the phosphor of the present invention having a specific shape as described above, the major axis diameter of a primary particle is preferable to be in a range of 0.1 to 3 μm, more preferably, in a range of 0.1 to 1 μm, and further preferably, in a range of 0.1 to 0.5 μm.

Further, the ratio of the major axis diameter and a maximal value of the minor axis diameter is preferable to be in a range of 1.1 to 10, more preferably, in a range of 1.3 to 8, and further preferably, in a range of 1.5 to 5. Furthermore, the ratio of a maximal value and a minimal value of the minor axis is preferable to be in a range of 1.1 to 10, more preferably, in a range of 1.2 to 5, and further preferably, in a range of 1.3 to 3.

It is preferable that particles having above-described shape are contained not less than 80 wt %, and more preferably, not less than 90 wt %.

The clear reason is not known exactly, however, the luminescence intensity of a phosphor becomes high and the persistence time becomes short by having a shape described above. Particularly, the effect appears remarkably in a green emitting phosphor represented by a composition formula of $Zn_2SiO_4$:Mn.

[First and Second Embodiment]

Next, the method for producing a phosphor according to the present invention will be explained.

At first, a method for producing a silicate phosphor according to a first embodiment of the present invention, comprises a precursor forming step for forming a precursor including a metallic element (capable of forming the silicate phosphor by calcining) around particles of a silicon system material that become center nuclei of the silicate phosphor in a uniform composition; and calcining step for calcining in a state that fusion of the particles of the silicon system material is not substantially occurred, and obtaining the silicate phosphor in which the metallic element is dispersed and mixed within the particles of the silicon system material particles.

Further, a method for producing a silicate phosphor according to a second embodiment of the present invention comprises a precursor forming step for forming a precursor of the silicate phosphor in a liquid phase; and calcining step for calcining the obtained precursor so as to obtain the silicate phosphor. Drying may be performed before the calcining.

Hereinafter, the methods for performing each phosphor according to the first and second embodiments of the present invention will be explained in detail by dividing the methods in (A) Precursor Forming Step and (B) Calcining Step.

(A) Precursor Forming Step

At first, the precursor forming step in the first embodiment will be explained.

In the precursor forming step, it is preferable to form a precursor by mixing dispersion liquid or solution in which elements as raw materials of the silicate phosphor are dispersed or dissolved, which is so-called a liquid phase method. The precursor forming step may be performed by a solid phase method if the constituting elements can be mixed uniformly. However, since a mechanical dispersion and crushing step is performed when producing according to the solid phase method, there is a possibility that crystal defects and the like occur when producing a phosphor of fine particles, and deterioration of brightness property and the like is caused. On the contrary, the liquid phase method does not have a mechanical dispersion and crushing step, and besides, since the constituting elements of the phosphor can be mixed uniformly in a liquid phase, dispersion of each ion forming the silicate phosphor becomes extremely well at the time of reaction. As a result, it becomes to have stoichiometrically high purity, and the composition of the metallic element deposited around the particles of the silicon system material becomes uniform easily. Further, since it is a liquid phase reaction, the reaction efficiency is also high.

The elements which become raw materials of the silicate phosphor are silicon and the above-mentioned metallic elements capable of forming a silicate phosphor with the silicon system material by calcining. Silicon and these metallic elements may be a simple substance or may be various metallic compounds such as oxide, chloride, nitrate and the like.

As the liquid phase method, a general liquid phase method such as coprecipitation method, reactive crystallization method, sol-gel method or the like can be used. However, particularly, it is preferable to form a precursor according to the coprecipitation method by using the particles of a silicate compound (silicon system material) such as silica or the like as center nuclei of the precursor. By forming a precursor in such a manner, a silicate phosphor having more excellent luminescence intensity can be obtained. Further, when forming a precursor according to the reactive crystallization method or the sol-gel method, from the viewpoint of obtaining a phosphor having finer particles and narrow particle size distribution, it is preferable to perform under addition of the later-described protective colloid.

At first, the coprecipitation method will be explained. The coprecipitation method is a method of synthesizing a phosphor precursor by utilizing a coprecipitation phenomenon in a state of depositing the metallic element or the like, which is capable of forming a silicate phosphor around the center nuclei of the phosphor precursor by calcining, by mixing a solution including elements which become raw materials of the phosphor and further adding a precipitant. Here, the precipitation phenomenon means a phenomenon such that there is sufficient solubility in the situation when precipitation is caused from the solution, and that precipitation of ions which are not supposed to precipitate is accompanied. In production of a phosphor, it means the phenomenon such that the metallic element and the like for forming an activator are deposited around the center nuclei of a phosphor precursor.

In the following, the method for producing a precursor of a silicate phosphor by utilizing the coprecipitation method and by using the particles of the silicon system material particles as center nuclei of a precursor (the method for producing a precursor of a phosphor according to the present invention) will be referred to as a "silica nuclei method".

In order to form a precursor according to the silica nuclei method, a silicon system liquid material in which a silicon system material is dispersed in a liquid is mixed with a material such that a metallic element is dissolved in a liquid in a positive ion state, or with a metal system liquid material in which a solid metallic element is dispersed in a liquid.

In a second embodiment according to the present invention, it is particularly preferable to use the silica nuclei method.

That is, in the precursor forming step in the second embodiment, a silicon system liquid material in which a silicon system material is dispersed in a liquid, and a metal system liquid material including a metallic element, which forms a silicate phosphor with the silicon system material by calcining, are mixed to form a precursor of the silicate phosphor in a liquid phase. By calcining this precursor, a phosphor having stoichiometrically high purity and uniform composition can be obtained.

Next, the silicon system liquid material in the silica nuclei method will be explained.

In the silica nuclei method, the silicon system material is preferable to be substantially insoluble in the later-described liquid, and is silicon (simple substance) or a compound including silicon.

As a compound including silicon, for example, silicon dioxide (silica) can be used preferably. As silicon dioxide, gas phase method silica, wet silica, colloidal silica and the like can be used. In detail, silica is roughly divided into two from viewpoint of producing method, one is gas phase method silica and the other is wet silica. The wet silica includes precipitation method silica, gel method silica, colloidal silica and the like. In the present invention, the colloidal silica is preferable. When using the colloidal silica, although it is not limited particularly, an anionic one is preferable. Further, the particle size is not more than 1 μm similarly to the above, preferably, not more than 0.5 μm, and more preferably, not more than 0.1 μm.

The BET specific surface area of the silicon system material of the present invention is preferable to be not less than 50 m$^2$/g, more preferably, not less than 100 m$^2$/g, and further preferably, not less than 200 m$^2$/g.

Here, the "BET specific surface area" is the specific surface area measured by the BET method. The specific surface area is the amount represented by total surface area of particles included in powders of a unit quantity. In this case, it is the total surface area of the particles of the silicon system material particles included in unit mass.

The BET method is a method generally used for measuring a specific surface area, and utilizes adsorption of gas. In this method, a molecule or ion whose size is known beforehand is adsorbed on a particle surface of a powder, and a surface area is calculated from the adsorbed amount by applying a BET isothermal adsorption process.

The primary particle size or the secondary agglomerated particle size of the particles of the silicon system material particles in the present invention is preferable to be not more than 1 μm, more preferably, not more than 0.5 μm, further preferably, not more than 0.1 μm, and most preferably, not more than 0.01 μm. The primary particle size or the secondary agglomerated particle size of the silicon system material is preferable to be not more than 0.1 μm since finer phosphor can be obtained. The mean particle size of the silicate phosphor after calcining can be made to a desired size by controlling the primary particle size or the secondary agglomerated particle size of the particles of the silicon system material particles.

In addition, the primary particle size is the particle size of a primary particle when using one crystallite as the primary particle. Further, the secondary agglomerated particle size is the particle size of a secondary agglomerated particle formed by agglomeration of primary particles of the silicon system material in liquid.

As the liquid for dispersing the silicon system material, it may be anything if it does not substantially dissolve the silicon system material. Water, alcohols or their mixture is preferable. As alcohols, it may be anything if it disperses the silicon system material. For example, methanol, ethanol, isopropanol, propanol, butanol and the like can be given. Among these, ethanol in which the silicon system material can be dispersed comparatively easily is preferable.

Here, "do not substantially dissolve the silicon system material" means that the solubility of the silicon system material to the liquid is in a range of not more than 0.1%.

In the present invention, it is preferable to prepare the silicon system liquid material beforehand. Here, to "prepare beforehand" means to prepare the dispersion state of the silicon system material in liquid or to prepare the secondary agglomerated particle size of the silicon system material beforehand so as to make it into a desired state.

As an example of preparing method, agitation can be given. When agitating, the secondary agglomerated particle size or the dispersion state of the silicon system material can be made in a desired state by combing the agitation speed and the agitation time to the silicon system liquid material. As more effective method, performing ultrasonic dispersion of the silicon system liquid material can be given.

Further, at the time of preparation, a surfactant or a dispersant may be added if required. Furthermore, the temperature of the silicon system liquid material when performing preparation is preferable to be not more than 50° C., preferably, not more than 30° C., and more preferably, not more than 10° C. from viewpoint of preventing viscosity rise according to re-agglomeration of the silicon system material.

In addition, when using the above-describe colloidal silica, since its particle size and dispersion state in liquid are prepared beforehand, a suitable one may be used appropriately.

As described above, the dispersion state of the silicon system material in liquid becomes well and the secondary agglomerated particle size and the like become constant by preparing the silicon system liquid material beforehand or by using the colloidal silica. Thereby, the obtained precursor becomes the one having uniform composition, so that the silicate phosphor obtained after calcinign can also become the one having chemically high purity and uniform composition.

Next, the metal system liquid material will be explained.

In the present invention, the metallic element is a metallic element capable of forming a silicate phosphor with a silicon system material by calcining, and does not include silicon. The metallic element may be a simple substance or may be various metallic compounds such as chloride, nitrate and the like.

Further, the metal system liquid material is the one that the above-described metallic element is dissolved in liquid in a state of positive ion or the like, or the one that a solid metallic element is dispersed in liquid.

The liquid for dissolving or dispersing the metallic element may be anything if it does not substantially dissolves the silicon system material. Similar to the above, it is preferable to be water, alcohols or their mixture. As alcohols, methanol, ethanol, isopropanol, propanol, butanol and the like can be given. Particularly, ethanol is preferable.

In the above-described silica nuclei method (precursor forming step), when mixing the silicon system liquid material with the metal system liquid material, a solution including a precipitant for forming a precipitate by reacting with the metallic element may be mixed.

Here, the solution including a precipitant means an agent in which a precipitant shown in the following is dissolved in water, alcohols or their mixture. As alcohols, concretely, methanol, ethanol, isopropanol, propanol, butanol and the like can be given. It may be anything if it disperses the silicon system material.

As the precipitant, organic acid or alkali hydroxide can be used preferably. Organic acid or alkali hydroxide forms an organic salt or hydroxide as a precipitate by reacting with the metallic element. At that time, the precipitate of these is preferable to be deposited around the particles of the silicon system material that become center nuclei of the phosphor.

Further, the amount of the used precipitant is preferable to be not less than one time of the stoichiometric amount required to deposit the metallic element as a precipitate of organic salt, hydroxide or the like.

As organic acid, it is preferable to have a carboxylic acid function (—COOH). Concretely, oxalic acid, formic acid, acetic acid, tartaric acid and the like can be given. Further, it may be the one that generates oxalic acid, formic acid, acetic acid, tartaric acid or the like according to hydrolysis or the like.

Particularly, oxalic acid is preferable since it can easily react with the positive ion of Zn, Mn, Mg, Ca, Sr, Ba, Y, Zr, Al, Ga, La, Ce, Eu and Tb given as the metallic elements in the above, and the positive ion of Zn, Mg, Ca, Sr, Ba, Y, Zr, Al, Ga, La, Ce, Eu and Tb can be easily deposited as oxalate. Further, dimethyl oxalate and the like that generates oxalic acid according to hydrolysis or the like can be also used preferably.

As alkali hydroxide, it may be anything if it is the one having hydroxy group (—OH), the one for generating hydroxy group by reacting with water, or the one for generating hydroxy group according to hydrolysis. For example, ammonia, sodium hydroxide, potassium hydroxide, urea and the like can be given. Among these, ammonia is preferably used, and particularly, ammonia which does not include alkali metal is further preferably.

Next, the reactive crystallization method and the sol-gel method will be explained.

The reactive crystallization method is a method for synthesizing a precursor by utilizing a crystallization phenomenon, which is by mixing a silicon system material which becomes a raw material of the precursor of a silicate phosphor with a solution including a metallic element except silicon. These are preferable to be chlolide, nitrate, sulfate or the like. Further, it is preferable to dissolve these in a solvent in a state of positive ion. For example, sodium metasilicate can be used preferably as the silicon system material.

In addition, the crystallization phenomenon is a phenomenon such that a solid phase is deposited from a liquid phase when physical or chemical change of environment according to cooling, evaporation, pH regulation, concentration or the like, or when change in a state of the mixed system is caused by chemical reaction, or the like.

The method for producing a precursor according to the reactive crystallization method of the present invention means a producing method according to physical or chemical operation which can be exciting cause of the crystallization phenomenon described above.

The sol-gel method is generally a producing method by mixing a required amount of the silicon system material and the metallic element except silicon that become raw materials of the precursor as metalalkoxide, metallic complex, double alkoxide made by adding metal simple substance in their organic solvent solution, metal halide, metal salt of organic acid, metal simple substance and the like, and by performing thermal or chemical polycondensation. For example, as the silicon system material, $Si(OCH_3)_4$ in which silicon is used as metalalkoxide, or the like can be used.

Any solvent may be used if the reactive raw materials are dissolved when applying the above-described reactive crystallization method or sol-gel method. However, water is preferable from viewpoint of easiness of supersaturation control. Further, in case of the sol-gel method, a mixed solution of water and alcohols such as ethanol or the like is a preferable mode. The order of addition of the reactive raw materials to the solvent may be the same time or different time. A suitable order can be decided appropriately according to the activity.

Further, in case of forming a precursor by using the above-described reactive crystallization method or the sol-gel method, it is preferable to adjust various physical properties such as reaction temperature, addition rate, addition position, agitation conditions, pH and the like. It is also preferable to add protective colloid, surfactant or the like to control the mean particle size. It is also one of preferable modes to concentrate or age the liquid when addition of raw materials is completed, if required.

Particularly, it is preferable to add protective colloid since the particle size or agglomerated state of the phosphor particles can be controlled and the mean particle size of the phosphor particles after calcining can be made in a desired size in a range of 0.01 to 1.0 μm.

As such a protective colloid, various high-molecular compounds can be used regardless of natural or artificial, however, protein is particularly preferable. In this case, the mean molecular weight of protective colloid is preferable to be not less than 10,000, more preferably, between not less than 10,000 and not more than 300,000, and particularly, between not less than 10,000 and not more than 30,000 is preferable.

As protein, for example, gelatin, water-soluble protein, water-soluble glycoprotein and the like can be given. Concretely, albumin, ovalbumin, casein, soybean protein, synthesis protein, genetically-engineered protein and the like can be given. Among these, particularly, gelatin can be used preferably.

As gelatin, for example, lime-treated gelatin and acid-treated gelatin can be given. These may also be used together. Furthermore, hydrolyzate of these gelatins or enzyme decomposer of these gelatins may also be used.

Further, the above-described protective colloid is not required to be a single component. Various binders may be mixed in the protective colloid. Concretely, for example, a graft polymer of the above-described gelatins and other polymers can be used.

The protective colloid can be added in one or more raw material solutions. It may be added in all of the raw material solution. The precursor can be made sufficiently small by forming the precursor under the existence of a protective colloid to prevent the agglomeration of the precursor particles. Thereby, various properties of the phosphor can be improved such that the phosphor after calcining becomes finer particles, particle size distribution becomes narrow, luminescence property becomes well, and the like. In addition, in case of performing reaction under existence of the protective colloid, it is required to give sufficient consideration to control of the particle size distribution of the precursor or removal of impurities such as excess soluble salts or the like.

Even though it is the case of utilizing any liquid phase synthesis method of the above-described coprecipitation method, reactive crystallization method and sol-gel method, it is desirable to mix each liquid uniform in the precursor forming step. The mixing method of each liquid (for example, silicon system liquid material, metal system liquid material and the like) is not limited particularly. However, the mixing method according to agitation is preferable since the mixed state or the like is easily controlled and it is low cost. Further, as the mixing method, it may be any method such as batch type, continuous type, external circulation mixing and the like.

Concretely, a method of using the silicon system liquid material as a mother liquid (ground) and adding the metal system liquid material in the mother liquid while agitating the mother liquid, or a method of circulating the mother liquid externally and adding the metal system liquid material in a mixer provided in the external circulation path; a method of using a solution not including the silicon system material as a mother liquid and adding the silicon system liquid material and the metal system liquid material in the mother liquid at the same time according to double jet while agitating the mother liquid, or a method of circulating the mother liquid externally and adding the metal system liquid material in a mixer provided in the external circulation path at the same time according to double jet; or the like can be given. It is preferable to mix in such a method since the reaction can be carried out in a state that the silicon system material is well dispersed in the liquid.

Further, in case of adding solution including a precipitant, the silicon system liquid material, the metal system liquid material and the solution including the precipitant may be mixed according to any method and order. Concretely, a method of using the silicon system liquid material as a mother liquid and adding the other liquids in the mother liquid at the same time according to double jet while agitating the mother liquid, or a method of circulating the mother liquid externally and adding the other liquids in a mixer provided in the external circulation path at the same time according to double jet; a method of using a liquid which does not include the silicon system material as a mother liquid and adding the silicon system liquid material, the metal system liquid material and the solution including the precipitant at the same time according to triple jet while agitating the mother liquid, or a method of circulating the mother liquid externally and adding the silicon system liquid material, the metal system liquid material and the solution including the precipitant at the same time according to triple jet; or the like can be given. It is preferable to mix in such a method since the reaction can be carried out in a state that the silicon system material is well dispersed in the liquid.

Regardless of presence or absence of the solution including a precipitant, the addition position of these liquids may be either the surface of the mother liquid or inside of the mother liquid. Inside of the mother liquid is preferable from viewpoint of more uniform mixing. Furthermore, the agitation Reynolds number is not less than 1000, preferably, not less than 3000, and more preferably, not less than 5000. Each liquid can be mixed uniformly by making the agitation Reynolds number not less than 1000.

In the precursor forming step, the dispersion of each ion forming the silicate phosphor at the time of reaction becomes extremely well by forming the precursor while mixing each liquid uniformly. As a result, a precursor having stoichimetically high purity and uniform composition can be obtained easily. Furthemore, with respect to the phosphor obtained by the later-described calcining step becomes to be an excellent one having uniform composition, high purity, high luminescence intensity, and short persistence time.

A drying step is preferable to be performed after the above-described precursor forming step and before the calcining step. As a drying temperature, it is preferable to be in a range of 20° C. to 300° C., and further preferably, 90° C. to 200° C. As a method for drying directly, evaporation, spray-dry to dry while granulating, and the like can be given.

Further, in the drying step, it is preferable to remove insoluble salts according to an existing method such as filtration and washing, membrane separation or the like before drying a precursor, if required. Furthermore, it is preferable to separate the precursor from the liquid according to a method such as filtration, centrifugal separation or the like.

(B) Calcining Step

At first, the calcining step in the first embodiment of the present invention will be explained.

The calcining step of the present invention is a step for calcining a precursor in a controlled state such that fusion of silicon system material particles is not substantially occurred, and obtaining a phosphor in which a metallic element disposed around the particles of the silicon system material is dispersed and mixed in the inside of the particles.

In the precursor forming step, since the metallic element can be deposited in a uniform composition around the particles of the silicon system material, the metallic element can be dispersed and mixed in the inside of the particles by controlling the calcining conditions. Further, since no mechanical mixing and crushing step or the like is performed in the precursor forming step, the particle shape can be also made in an approximately constant shape depending on the shape of the particles of the used silicon system material.

Here, the "state that fusion of the silicon system material particles is not substantially occurred" is a state such that fusion of particles is not occurred with respect to the particles of at least not less than 90% among the particles obtained after calcining (calcined product).

The fusion of the particles of the silicon system material deeply relates to the particle size and the calcining temperature. For example, when the particle size of the particles of the silicon system material is from 0.01 to 0.1 μm, the calcining temperature is preferable to be between 400° C. and 800° C. When the particle size of the particles of the silicon system material is from 0.1 to 0.5 μm, the calcining temperature is preferable to be between 600° C. and 1000° C. When the particle size of the particles of the silicon system material is from 0.5 to 1 μm, the calcining temperature is preferable to be between 800° C. and 1200° C.

The calcining is preferable to be performed one or more times under the above-described temperature conditions in a range of 0.5 to 100 hours. Thereby, the particles of the silicon system material are not fused together, so that the metallic element can be dispersed and mixed in the inside of the particles of the silicon system material.

A silicate phosphor of fine particles having the above-mentioned uniform shape of the present invention, high luminescence intensity and no luminescence unevenness can be obtained by calcining until it becomes to a predetermined crystallinity under the above-described temperature conditions. However, from viewpoint of improvement of productive efficiency, the calcining step is preferably divided into (1) metallic element dispersing and mixing step, (2) sintering inhibitor mixing step and (3) crystallizing step.

(1) The metallic element dispersing and mixing step is a step of calcining in a state that fusion of the silicon system material particles is not substantially occurred at a calcining temperature according to the particle size of the particles of the silicon system material, and dispersing sufficiently the metallic element in the inside of the particles.

(2) The sintering inhibitor mixing step is a step of mixing a sintering inhibitor in the obtained powder (calcined product) after the metallic element dispersing and mixing step in the above-described (1) is completed.

The sintering inhibitor is added to prevent fusion of the particles, and it is preferable to be consisted of one or more of metallic compounds which are chemically stable under high temperature, for example, metal oxides such as aluminum oxide, silicon oxide, zirconium oxide and the like, nitrides such as silicon nitride, aluminum nitride and the like, carbides such as silicon carbide, tungsten carbide, tantalum carbide and the like, and the like.

(3) The crystallizing step is a step of crystallizing a phosphor by re-calcining the mixture obtained by the sintering inhibitor mixing step in the above-described (2), and enhancing the crystallinity.

Since the sintering inhibitor is mixed, fusion of the particles can be prevented even though calcining is performed at a temperature higher than the calcining temperature in the metallic element dispersing and mixing step in the above-described (2). Therefore, a silicate phosphor having the desired crystallinity can be obtained in a short time. In addition, the re-calcining temperature is preferable to be in a temperature range between 1000° C. and 1400° C., and it is preferable to re-calcine one or more times in a range of 0.5 to 5 hours.

In addition, it is not preferable to add a sintering inhibitor in the metallic element dispersing and mixing step in the above-described (1) since there is a possibility that the metallic element is prevented from being dispersed and mixed in the particles of the silicon system material because the sintering inhibitor is acted.

On the other hand, it is not preferable to perform the crystallizing step in the above-described (3) without adding a sintering inhibitor since there is a possibility that the particles are fused together because the calcining temperature is high.

Next, the calcining step in the second embodiment will be explained.

The calcining of a precursor in the second embodiment may be performed by any method. The calcining temperature and time may be adjusted appropriately. For example, a desired phosphor can be obtained by filling an alumina boat with the precursor and calcining it in predetermined gas atmosphere at a predetermined temperature. Further, when calcining a precursor of a green phosphor ($Zn_2SiO_4$:Mn or the like), calcining is preferable to be performed one or more times in a temperature range between 400° C. and 1400° C. in inert atmosphere and in a range of 0.5 to 40 hours. Moreover, it may be combined with air atmosphere (or oxygen atmosphere) and reducing atmosphere, if required. When combining with the reducing atmosphere, it is preferable to calcine at a temperature of not more than 800° C. in order to prevent evaporation of a metallic element such as zinc or the like from the crystal. As a method for obtaining the reducing atmosphere, a method of putting a block of graphite in a boat filled with a precursor, a method of calcining in nitrogen-hydrogen atmosphere or rare gas-hydrogen atmosphere, and the like can be given. Vapor may also be included in these atmospheres.

By calcining a precursor, a phosphor having a desired composition is formed according to calcining reaction of the phosphor. At that time, a phosphor having more uniform composition can be obtained by forming the precursor in a liquid phase. Furthermore, it is estimated that the persistence time of the obtained phosphor may become short since $SiO_2$ solid solution is formed in the inside of the phosphor.

Further, in the first and second embodiments, treatments such as dispersing, washing, drying, sieving and the like may be performed to the obtained silicate phosphor after the calcining step is completed.

The phosphor produced by the above-described method can be suitably used for various devices such as fluorescent lamp, fluorescent display tube and the like, various display devices such as PDP, FED and the like, or for articles using phosphors such as fluorescent paints, ashtrays, stationeries, outdoor products, guide plates, inducing materials, indicators and the like.

[Third Embodiment]

Hereinafter, a plasma display panel as an example of a display device using the phosphor according to the present invention will be explained with reference to FIG. 2. In addition, the PDP is generally divided into an AC type for applying alternating voltage and a DC type for applying direct voltage from viewpoint of structure of electrodes and operation mode. In FIG. 2, the schematic arrangement of an example of an AC type PDP is shown.

The PDP 1 shown in FIG. 2 has two substrates 10 and 20 provided with electrodes 11 and 21; partition walls 30 provided between these substrates 10 and 20; a plurality of micro discharge cells (hereinafter, referred to as "discharge cells") 31 sectioned in a predetermined shape by the partition walls 30. The discharge cells 31 shown in FIG. 2 are the ones so-called stripe type such that the partition walls 30 are provided parallel per a predetermined distance (that is, in a stripe shape) when the substrates 10 and 20 are arranged horizontally.

Each discharge cell 31R, 31G and 31B is provided with a phosphor layer 35R, 35G and 35B comprising a phosphor which emits a light of red (R), green (G) or blue (B). Further, in the inner side of each discharge cell 31, discharge gas is charged, and at least one point such that the electrodes 11 and 21 are crossed in a planar view is provided.

The PDP 1 according to the third embodiment is the one that the above-described phosphor layer 35G is formed by using the phosphor produced by the producing method according to the present invention.

Hereinafter, each structure of the PDP 1 will be explained.

At first, the structure of the front plate 10 arranged in the display side of the two substrates will be explained. The front plate 10 transmits a visible light emitted from the discharge cells 31, and is for displaying various kinds of information on the substrates. The front plate 10 functions as a display screen of the PDP 1.

As the front plate 10, a material, such as soda lime glass (blue plate glass) or the like, for transmitting a visible light is preferably used. As for the thickness of the front plate 10, a range of 1 to 8 mm is preferable, and 2 mm is more preferable.

The front plate 10 is provided with discharge electrodes 11, a dielectric layer 12, a protective layer 13 and the like.

A plurality of discharge electrodes 11 are provided on a face of the front plate 10 that faces to the back plate 20, and are arranged regularly. Each of the discharge electrodes 11 comprises a scanning electrode 11$a$ and a sustaining electrode 11$b$. It has a structure such that the sustaining electrode 11$b$ similarly formed in a band-like shape is laminated on the scanning electrode 11$a$ formed in a wide-width band-like shape. In addition, the width of the sustaining electrode 11$b$ is formed narrower than that of the scanning electrode 11$a$.

Further, the discharge electrodes 11 are orthogonal to the partition walls 30 in a planar view.

As a scanning electrode 11$a$, a transparent electrode such as nesa-coated film or the like can be used. Its sheet resistance is preferable to be not more than 100 Ω. As the width of the scanning electrode 11$a$, a range of 10 to 200 µm is preferable.

The sustaining electrode 11 is a bus electrode for lowering the resistance. It can be formed by sputtering or the like of Cr/Cu/Cr. As the width of the sustaining electrode 11$b$, a range of 5 to 50 µm is preferable.

The dielectric layer 12 covers the whole surface of the front plate where the discharge electrodes 11 are disposed. The dielectric layer 12 can be formed from a dielectric material such as low-melting glass or the like. As the thickness of the dielectric layer 12, a range of 20 to 30 µm is preferable.

The surface of the above-described dielectric layer 12 is wholly covered with the protective layer 13. As for the protective layer 13, an MgO film can be used. As the thickness of the protective layer 13, a range of 0.5 to 50 µm is preferable.

Next, the structure of the back plate 20 side, which is the other substrate of the two substrates 10 and 20, will be explained.

The back plate 20 is provided with address electrodes 22, a dielectric layer 22, partition walls 30, phosphor layers 35R, 35G and 35B, and the like.

As the back plate 20, similar to the front plate 10, a soda lime glass (blue plate glass) or the like can be used. As the thickness of the back plate 20, a range of 1 to 8 mm is preferable, and about 2 mm is more preferable.

A plurality of the above-described address electrodes 21 are provided on the face of the back plate 20 that faces to the front plate 10. The address electrodes 21 are also formed in a band-like shape as well as the scanning electrode 11$a$ and the sustaining electrode 11$b$. A plurality of address electrodes 21 are provided per a predetermined distance so as to be orthogonal to the discharge electrodes 11 in a planar view.

As an address electrode 21, a metal electrode such as Ag thick film electrode or the like can be used. The width of the address electrodes 21 is preferable to be in a range of 100 to 200 µm.

The dielectric layer 22 covers the whole surface of the back plate 20 where the address electrodes 21 are provided. The dielectric layer 22 can be formed from a dielectric material such as low-melting glass or the like. As the thickness of the dielectric layer 22, a range of 20 to 30 µm is preferable.

On the above-described dielectric layer 22, the partition walls 30 are provided so as to protrude from the back plate 20 side to the front plate 10 side. The partition walls 30 are formed so as to be long and are provided on the both sides of each address electrode 21 to form the discharge cells 31 in stripe in a planar view as described above.

The partition walls 30 can be formed from a dielectric material such as low-melting glass or the like. The width of the partition walls 30 is preferable to be from 10 to 500 µm, and about 100 µm is more preferable. As the height (thickness) of the partition walls 30 is generally in a range of 10 to 100 µm, and about 50 µm is preferable.

Each discharge cell 31 is provided with one of the phosphor layers 35R, 35G and 35B emitting each color of lights as mentioned above, in a regular order.

The phosphor layer 35G among each phosphor layers 35R, 35G and 35B, which emits a green light, is preferable to have the above-described specific shape, and it is preferable to comprise a phosphor whose composition formula is represented with $Zn_2SiO_4$:Mn. In this case, the major axis diameter of primary particles of the phosphor is preferable to be in a range of 0.1 to 0.5 µm. Further, the ratio of the major axis diameter and a maximal value of the minor axis diameter is preferable to be in a range of 1.5 to 5, and the ratio of the major axis diameter and a minimal value of the minor axis diameter is preferable to be in a range of 1.3 to 3.

The phosphors forming the phosphor layers 35R and 35B that emits a red or blue light is not limited particularly. However, as for the phosphor for being used in the phosphor layer 35R which emits a red light, for example, the one whose composition formula is represented with $(Y,Gd)BO_3$:Eu can be used preferably. Further, as for the phosphor for being used in the phosphor layer 35B which emits a blue light, for example, the one whose composition formula is represented with $BaMgAl_{10}O_{17}$:Eu can be used preferably. Further, the mean particle size of these phosphors is preferable to be in a range of 0.1 to 3.0 µm, and more preferably, in a range of 0.1 to 1.0 µm. In addition, the mean particle size is a diameter of a sphere when considering a sphere equal to the volume of a particle.

Further, the thickness of the above-described phosphor layers 35R, 35G and 35B is not limited particularly, however, it is preferable to be in a range of about 5 to 50 µm.

The PDP 1 shown in FIG. 2 can be produced according to the following method.

At first, transparent electrode as scanning electrodes 11a are arranged on the front plate 10. Next, sputtering of Cr—Cu—Cr is performed, and sustaining electrodes 11b are formed on the scanning electrodes 11a by performing photoetching so as to form discharge electrodes 11. Then, a low-melting glass is printed on the front plate 10 so as to cover the discharge electrodes 11, and this is calcined at 500° C. to 600° C. to form a dielectric layer 12. Moreover, electron beam evaporation of MgO is performed on the dielectric layer 12 to form a protective layer 13.

On the other hand, on the back plate 20, an Ag thick film is printed, and address electrodes 22 are formed by calcining this. Then, partition walls 30 are formed on the back plate 20 and in both sides of each address electrodes 22. The partition walls 30 can be formed by printing a low-melting glass with a pitch of 0.2 mm and calcining it. Furthermore, phosphors prepared in paste-like are applied or filled to the bottom face (on the address electrodes 21) and the side face of each discharge cell 31 sectioned by the partition walls 30. Thereafter, the phosphor pastes are dried or calcined to remove the organic constituent in the pastes, and phosphor layers 35R, 35G and 35B that luminous colors are different are formed in the discharge cells 31R, 31G and 31B, respectively.

In addition, when preparing the phosphor in paste-like, a solvent, binder resin, dispersant or the like may be mixed appropriately with the phosphor.

Then, the front plate 10 and the back plate 20 arranged with the electrodes 11 and 21 and the like are aligned so that each electrode arranged face may be face to each other. Then, its periphery is encapsulated by a seal glass (not shown) in a state of keeping a gap of approximately 1 mm. Then, a gas in which Xenon (Xe) for generating ultraviolet rays by discharging and Neon (Ne) as a main discharge gas is charged between the substrates 10 and 20, and this is sealed up tightly. Thereafter, aging is performed. The PDP 1 can be produced according to the above.

Such displays such as PDP 1 and the like according to the present invention can improve the brightness and can display moving images smoothly by using the green phosphor obtained by the producing method of the present invention. Particularly, since the luminescence intensity of the green phosphor having high visibility improves and the persistence time becomes short, the white brightness improves, and moreover, afterimage, flickering of images, or the like according to afterglow can be prevented.

Furthermore, the phosphor as one mode of the present invention has a specific shape and its major axis diameter is extremely fine of 0.1 to 3 µm. Therefore, for example, the phosphor can be applied effectively in the micro discharge cells such as the discharge cells 31 or the like of the PDP 1. Accordingly, the brightness of the display or the like can be improved more.

[Fourth Embodiment]

Hereinafter, a plasma display panel as another example of a display device in which the silicate phosphor according to the present invention will be explained with reference to FIGS. 3 and 4. In FIG. 3, the schematic arrangement of another example of an AC type PDP is shown.

Between two substrates 50 and 60 shown in FIG. 3, one is a front plate 50 arranged in the display side, and the other is a back plate 60 arranged in the backside. The front plate 50 and the back plate 60 are arranged so as to be faced by keeping a predetermined distance by partition walls 70 provided between the substrates 50 and 60.

At first, the structure of the front plate 50 side will be explained.

The front plate 50 can be formed from a material which transmits a visible light, for example, a soda lime glass or the like. The facing face of the front plate 50 that faces to the back plate 60 is provided with electrodes 51, a dielectric layer 52, a protective layer 53 and the like, as shown in FIG. 3.

Each electrode 51 provided on the front plate 50 comprises a pair of a scanning electrode 51a and a sustaining electrode 51b. The scanning electrodes 51a and the sustaining electrodes 51b are formed in a band-like shape, respectively. The scanning electrode 51a and the sustaining electrode 51b are formed to keep a predetermined discharge gap. Plasma discharge for emitting a phosphor is performed according to surface discharge between these scanning electrodes 51a and the sustaining electrodes 51b.

Figure 4:
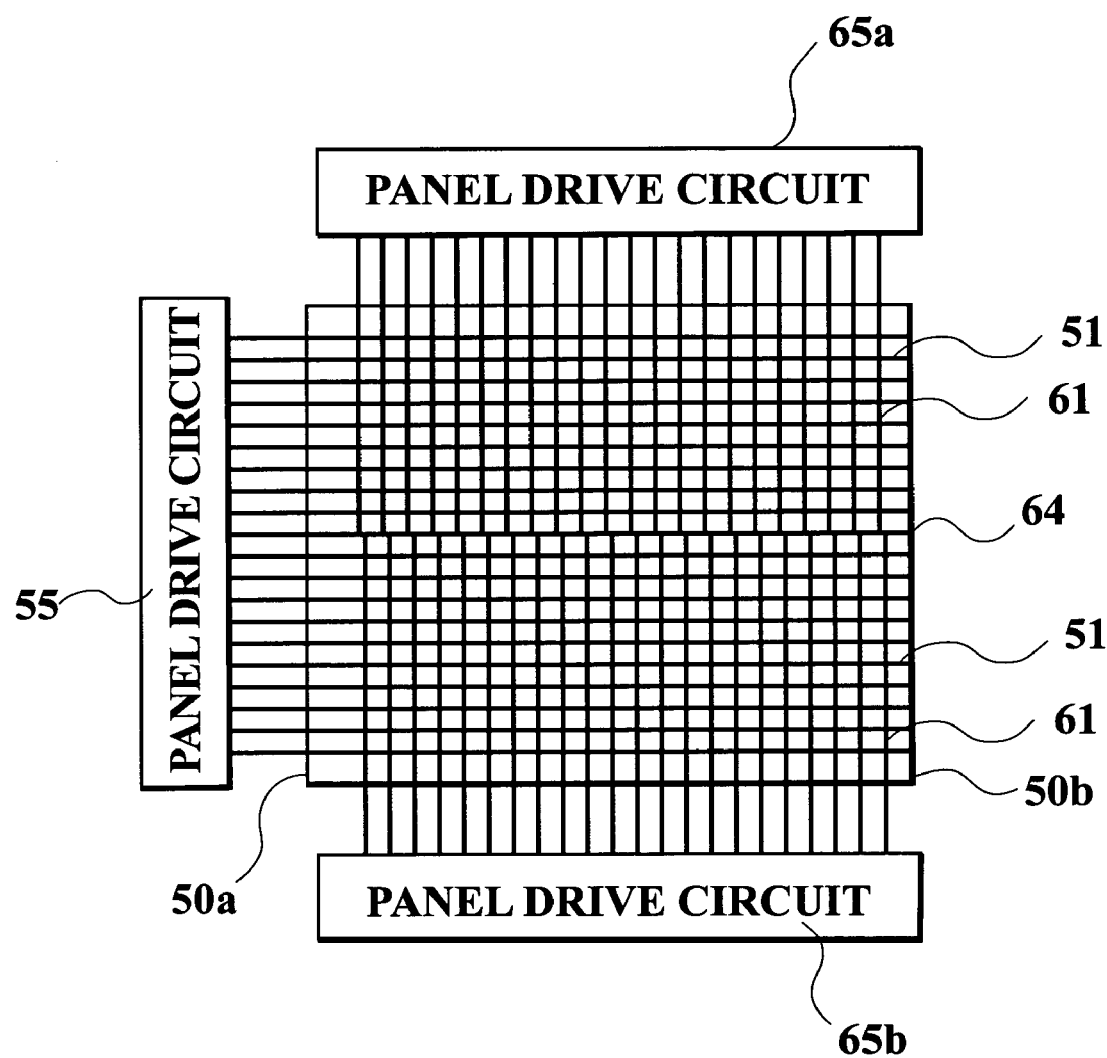
FIG. 4 is a plan view schematically showing arrangement of electrodes provided to the plasma display panel shown in FIG. 3.

The electrodes 51 are provided so as to cut across continuously from the end 50a to the end 50b of the front plate 50, as shown in FIG. 4, and are arranged regularly by keeping a predetermined distance between each other. Each electrode 51 is connected to a panel drive circuit 55, and voltage can be applied to a desired electrode 51.

As shown in FIG. 3, the dielectric layer 52 is provided so as to cover the whole surface of the front plate 50 where these electrodes 51 are disposed. The dielectric layer 52 is made of a dielectric material, generally, it is often formed from a lead system low-melting glass. Beside this, the dielectric layer 52 may be formed from a bismath system low-melting glass, a laminated material of a lead system low-melting glass and a bismuth system low-melting glass, or the like.

The surface of the dielectric layer 52 is covered with the protective layer 53. The protective layer 53 is preferable to be a thin layer comprising magnesium oxide (MgO).

Next, the structure of the back plate 60 side will be explained.

The back plate 60 is formed in approximately the same size as the front plate 50, and can be formed from a soda lime glass or the like as the front plate 50. The face of the back plate 60 that faces to the front plate 50 is provided with a plurality of data electrodes 61, a dielectric layer 62, partition walls 70 and the like.

The data electrodes 61 are formed in a band-like shape as the above-described electrodes 51, and are provided per a predetermined space. In both side of each date electrode 61, the partition walls 70 are provided. The data electrodes 61 are divided in a central portion 64 of the back plate 60, and are connected to panel drive circuits 65a and 65b, respectively. Voltage can be applied to a desired electrode 61 according to the panel drive circuits 65a and 65b.

As shown in FIG. 3, the whole surface of the back plate 60 where the data electrodes 61 are disposed is covered with the dielectric layer 62. Similar to the dielectric layer 52, the dielectric layer 62 can be formed from a lead system low-melting glass, a bismuth system low-melting glass, a laminated material of a lead system low-material glass and a bismuth system low-melting glass, or the like. Furthermore, it is preferable to mix $TiO_2$ particles in these dielectric materials to combine with a function as a visible light reflecting layer. When the dielectric layer 62 is functioned as a visible light reflecting layer, even though a light is emitted from the phosphor layers 75R, 75G and 75B to the back plate 60 side, this light can be reflected to the front plate 50 side. Thereby, the lights transmitting the front plate 50 can be increased, so that the brightness can be improved.

The partition walls 70 are provided on the upper surface of the above-described dielectric layer 62 so as to protrude from the back plate 60 side to the front plate 50 side. The partition walls 70 section the space between the substrates 50 and 60 in a predetermined shape to form discharge cells 71 as mentioned before. The partition walls 70 are formed from a dielectric material such as glass material or the like.

The discharge cells 71 are discharge spaces surrounded by the partition walls 71 and the substrates 50 and 60 as described above. On the side face 70a of each partition wall 70 and the bottom face 71a of each discharge cell 71 that face the inside of the discharge cells 71, phosphor layers 75R, 75G and 75B that emit one of red (R), green (G) and blue (B) lights are provided regularly in an order of R, G and B. In the inner portion of the discharge cells 71, a discharge gas using mainly a rare gas is charged. As the discharge gas, particularly, it is preferable to use a mixed gas in which Ne used as a main discharge gas is mixed with Xe for generating ultraviolet rays by discharge. In addition, the charging pressure when charging the mixed gas is not limited particularly, however, for example, it is preferable to be about 66.7 mPa.

The discharge cells 71 shown in FIG. 3 is the ones so-called a stripe type. The partition walls 70 are provided on both sides of each data electrode 61, so that the discharge cells 71 are formed in a parallel groove-like shape.

Here, the arrangement of the discharge cells 71 and the electrodes 51 and 61 will be explained.

As shown in FIG. 4, the electrodes 51 and the data electrodes 61 are orthogonal to each other in a planar view, and are matrix-like. In one of the discharge cells 71, a number of intersection points of the electrodes 51 and the data electrodes 61 are provided. Discharge can be performed selectively on the intersection points of the electrodes 51 and the data electrodes 61, and thereby, the desired information can be displayed. Hereinafter, a space of the cell such that the volume of one cell is divided by the intersection points of the electrodes in the cell is referred to as a "minimum emission unit". In the PDP 5, three minimum emission unit of the adjacent discharge cells 71R, 71G and 71B become one pixel.

In the present invention, at least one color of R, G and B of the phosphor layers 75R, 75G and 75B contains the silicate phosphor of the present invention. When forming the phosphor layers, various methods which are known well in earlier technology can be used. For example, a phosphor layer can be formed by applying or filling the phosphor prepared in paste-like to the bottom face (on the address electrodes 61) and the side face of the discharge cells 71 sectioned by the partition walls 70, drying or calcining the phosphor paste, and removing the organic constituent in the paste.

In addition, when preparing a phosphor in paste-like, a solvent, binder resin, dispersant or the like may be mixed appropriately in the phosphor.

Further, as a method for applying or filling the phosphor paste between the partition walls, various methods such as screen printing method, photoresistfilm method, inkjet method and the like can be used. Among these, as an application method for making the pitch of the partition walls fine in a high-definition rib structure and forming a phosphor layer between the partition walls in low cost, easily, in good accuracy, and uniformly, the inkjet method is preferable to be applied particularly.

As for displays such as the PDP 5 and the like according to the fourth embodiment, the panel brightness can be improved by forming a phosphor layer by using the silicate phosphor obtained by the production method of the present invention. Particularly, when a green phosphor of the silicate phosphors is used, since the luminescence intensity of the green cells having high visibility can be improved, the white brightness improves.

Furthermore, since the silicate phosphor according to the present invention has a small particle size and approximately uniform shape, for example, the silicate phosphor can be applied effectively in the micro discharge cells such as the discharge cells 71 of the PDP 5. Accordingly, the brightness of the display and the like can be improved more.

EXAMPLES

Next, the present invention will be explained in detail according to Examples. However, the present invention is not limited to these Examples.

Example 1

1. Production of Phosphors (1) Production of Silicate Phosphor 1-1

At first, liquid A was prepared by mixing 11.27 g of silicon dioxide (snowtex MP-4540M, 40 wt %, particle size of 0.5 μm, produced by Nissan Chemical Industries, Ltd.) with 516.29 g of pure water. At the same time, liquid B was prepared by dissolving 42.39 g of zinc nitrate hexahydrate and 2.15 g of manganese nitrate hexahydrate in 51.84 g of pure water. Furthermore, liquid C was prepared by mixing 21.90 g of aqueous ammonia (28%) in 50.67 g of pure water.

Figure 6:
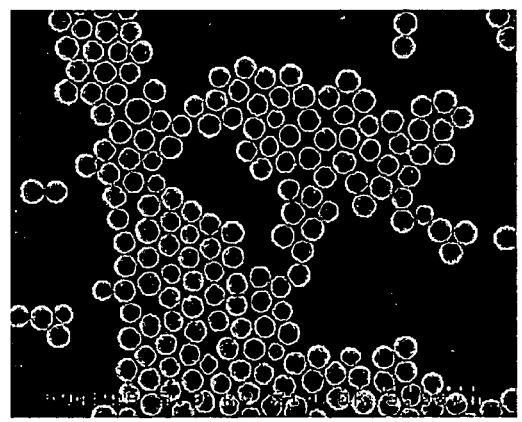
FIG. 6 is a scanning electron microscope photograph showing silicon dioxide used as a raw material in Example 1.

In addition, a scanning electron microscope (SEM) photograph of the used silicon dioxide is shown in FIG. 6. As obvious from FIG. 6, it can be recognized that the particles of the silicon dioxide have a spherical shape, and the particle size and the particle shape are equal.

Figure 5:
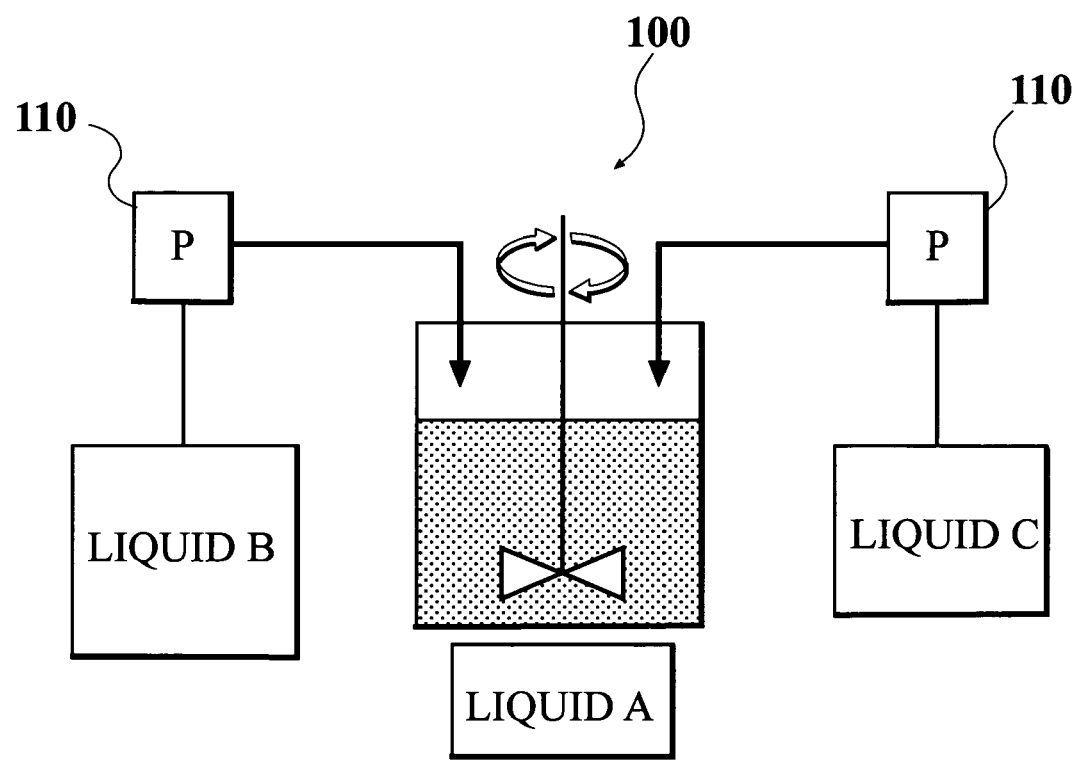
FIG. 5 is a schematic view showing an example of a reactor used in a method for producing a phosphor of the present invention.

Next, by using a reactor 100 shown in FIG. 5, the liquid B and liquid C were added simultaneously into the surface of the liquid A according to double jet at an addition rate of 10 cc/min by using roller pumps 110 while agitating the liquid A at 40° C. After the liquid B and liquid C were added, the mixed liquid was agitated for a few minutes (that is, the time that the reaction promotes sufficiently), and thereafter, the reacted material was washed sufficiently by using pure water while performing solid-liquid separation according to suction filtration. Then, drying at 40° C. was performed for 50 hours, and a dried precursor was obtained.

Next, the obtained precursor was calcined in 100% nitrogen atmosphere at 900° C. for 50 hours, and a silicate phosphor 1-1 was obtained.

(2) Production of Silicate Phosphor 1-2

A silicate phosphor 1-2 was obtained in the same manner as the silicate phosphor 1-1 of the above-described (1) except that the silicon dioxide was changed to snowtex MP-2040 (40 wt %, particle size of 0.2 μm) produced by Nissan Chemical Industries, Ltd., and that the precursor was calcined at 850° C. for 70 hours.

(3) Production of Silicate Phosphor 1-3

A silicate phosphor 1-3 was obtained in the same manner as the silicate phosphor 1-1 in the above-described (1) except that the silicon dioxide was changed to snowtex O40 (40 wt %, particle size of 0.03 μm) produced by Nissan Chemical Industries, Ltd., and that the precursor was calcined at 750° C. for 90 hours.

(4) Production of Comparative Example 1

A phosphor (Comparative Example 1) was obtained in the same manner as the silicate phosphor 1-1 of the above-described (1) except that the precursor was calcined at 1200° C. for 3 hours.

2. Evaluation

With respect to the obtained silicate phosphors 1-1 to 1-3 and the Comparative Example 1 in the above, (1) luminescence intensity and (2) particle shape were evaluated.

(1) Evaluation of Luminescence Intensity

Ultraviolet rays were irradiated to the silicate phosphors 1-1 to 1-3 and the Comparative Example 1, respectively, in a vacuum chamber of 0.1 to 1.5 Pa by using an excimer 146 nm lamp (produced by Ushio INC.), and green lights were emitted from the silicate phosphors. Next, the intensity of each of the obtained green lights was measured by using a detector (MCPD-3000 (produced by Otsuka Electronics Co., Ltd.)). Then, the peak intensity of emission was calculated with a relative value by using the Comparative Example 1 as 100. The obtained results are shown in Table 1.

TABLE 1

| SILICATE PHOSPHOR | RELATIVE LUMINESCENCE INTENSITY [%] |
| --- | --- |
| PHOSPHOR 1-1 | 123 |
| PHOSPHOR 1-2 | 126 |
| PHOSPHOR 1-3 | 120 |
| COMPARATIVE EXAMPLE 1 | 100 |

According to Table 1, as the calcining step according to the present invention, the precursor in which metallic elements are included in a uniform composition around the particles of the silicon system material was calcined at a temperature that the particles of the silicon system material are not fused together. Thereby, a result such that the luminescence intensity of the silicate phosphors becomes high by diffusing and mixing the metallic elements uniformly in the particles and by crystallizing was obtained.

(2) Evaluation of Particle Shape

Next, the scanning electron microscope (SEM) photographs of the above-described silicate phosphors 1-1 to 1-3 and the Comparative Example 1 are shown in FIGS. 7 to 10.

Further, the mean particle size calculated by selecting randomly 100 phosphor particles taken in the scanning electron microscope is shown in Table 2.

TABLE 2

| SILICATE PHOSPHOR | MEAN PARTICLE SIZE (μm) | MEAN PARTICLE SIZE OF SILICON DIOXIDE (μm) |
| --- | --- | --- |
| PHOSPHOR 1-1 | 0.52 | 0.5 |
| PHOSPHOR 1-2 | 0.21 | 0.2 |
| PHOSPHOR 1-3 | 0.03 | 0.03 |
| COMPARATIVE EXAMPLE 1 | 1.58 | 0.5 |

Figure 10:
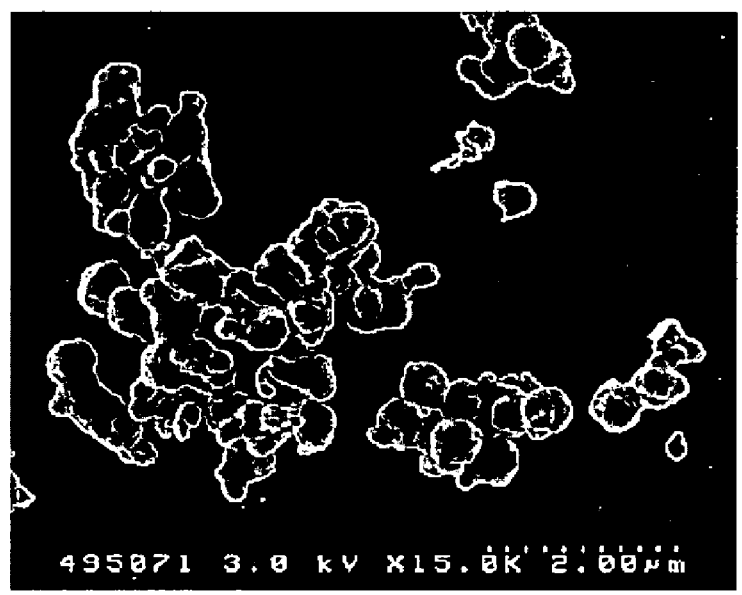
FIG. 10 is a scanning electron microscope photograph showing a phosphor in Comparative Example 1.

As shown in FIG. 10, the phosphor obtained by producing method in the Comparative Example 1 has particles showing an indefinite shape that are fused together, and the particle shape among particles was uneven. Further, its shape differs significantly from the used silicon dioxide (FIG. 6). Its mean particle size increases from 0.5 μm to 1.58 μm, and variation also was generated in the particle size distribution.

Figure 7:
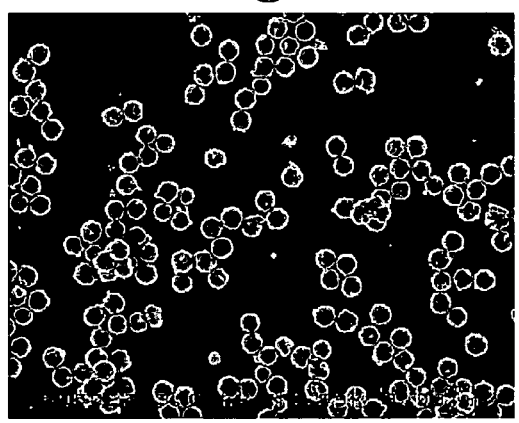
FIG. 7 is a scanning electron microscope photograph showing a phosphor 1-1 produced in the Example 1.
Figure 8:
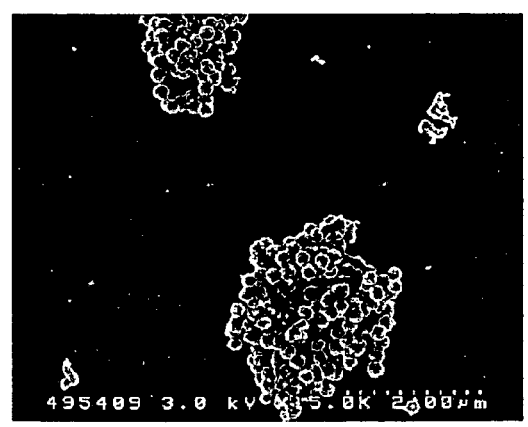
FIG. 8 is a scanning electron microscope photograph showing a phosphor 1-2 produced in the Example 1.
Figure 9:
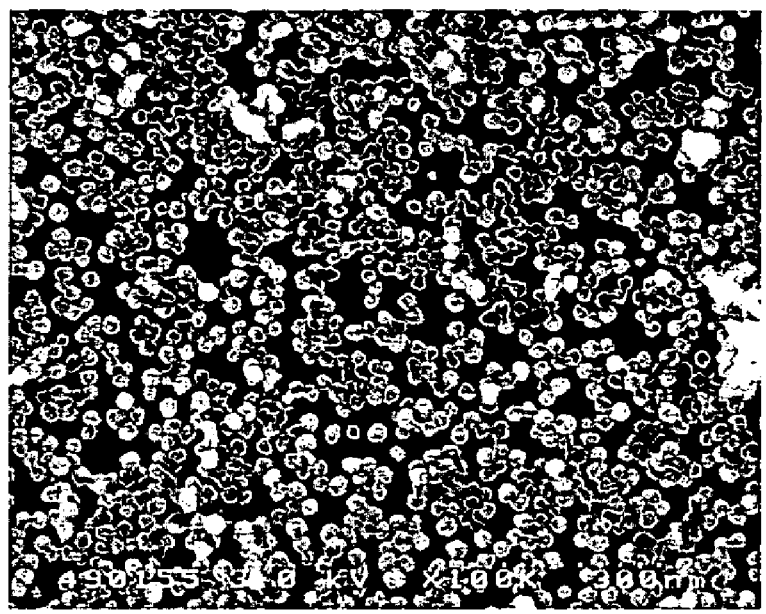
FIG. 9 is a scanning electron microscope photograph showing a phosphor 1-3 produced in the Example 1.

On the contrary, as shown in FIGS. 7 to 9, the phosphors 1-1 to 1-3 have an even particle shape, and the one having approximately the same shape as the used silicon dioxide could be obtained.

Example 2

1. Production of Phosphors (1) Production of Silicate Phosphor 2-1

The dried precursor obtained in the same manner as in the silicate phosphor 1-1 was first calcined in 100% nitrogen atmosphere at 950° C. for 3 hours, and other metallic elements were diffused and mixed in the silicon dioxide. Next, aluminum oxide C (sintering inhibitor produced by AEROSIL Co., Ltd.) was mixed in a ratio of 0.1 wt % to the obtained powders. Furthermore, the mixture was re-calcined in 100% nitrogen atmosphere at 1200° C. for 3 hours, and a silicate phosphor 2-1 was obtained.

(2) Production of Silicate Phosphor 2-2

The dried precursor obtained in the same manner as in the silicate phosphor 1-2 was first calcined in 100% nitrogen atmosphere at 900° C. for 3 hours, and other metallic elements were diffused and mixed in the silicon dioxide. Thereafter, a silicate phosphor 2-2 was obtained in the same manner as the silicate phosphor 2-1 by re-calcining.

(3) Production of Silicate Phosphor 2-3

The dried precursor was obtained in the same manner as in the silicate phosphor 1-3 was first calcined in 100% nitrogen atmosphere at 800° C. for 3 hours, and other metallic elements were diffused and mixed in the silicon dioxide. Thereafter, a silicate phosphor 2-3 was obtained in the same manner as the silicate phosphor 2-1 by re-calcining.

(4) Production of Comparative Example 2

The dried precursor obtained in the same manner as in the silicate phosphor 1-1 was first calcined in 100% nitrogen atmosphere at 950° C. for 3 hours, and other metallic elements were diffused and mixed in the silicon dioxide. Next, the obtained powders were re-calcined in 100% nitrogen atmosphere at 1200° C. for 3 hours, and a Comparative Example 2 was obtained.

2. Evaluation

With respect to the obtained silicate phosphors 2-1 to 2-3 and the Comparative Example 2 in the above, (1) luminescence intensity and (2) particle shape were evaluated.

(1) Evaluation of Luminescence Intensity

Ultraviolet rays were irradiated to the silicate phosphors 2-1 to 2-3 and the Comparative Example 2, respectively, in a vacuum chamber of 0.1 to 1.5 Pa by using an excimer 146 nm lamp (produced by Ushio INC.), and green lights were emitted from the silicate phosphors. Next, the intensity of each of the obtained green lights was measured by using a detector (MCPD-3000 (produced by Otsuka Electronics Co., Ltd.)). Then, the peak intensity of emission was calculated with a relative value by using the Comparative Example 2 as 100. The obtained results are shown in Table 3.

TABLE 3

| SILICATE PHOSPHOR | RELATIVE LUMINESCENCE INTENSITY [%] |
|---|---|
| PHOSPHOR 2-1 | 120 |
| PHOSPHOR 2-2 | 122 |
| PHOSPHOR 2-3 | 118 |
| COMPARATIVE EXAMPLE 2 | 100 |

As shown in Table 3, comparing with the Comparative Example 2 obtained by re-calcining without performing a sintering inhibitor mixing step, the result such that luminescent intensity of silicate phosphors becomes high by performing re-calcining (crystallizing step) after performing a sintering inhibitor mixing step as shown in the silicate phosphors 2-1 to 2-3 was obtained.

(2) Evaluation of Particle Shape

Next, the particle shapes of the above-described silicate phosphors 2-1 to 2-3 and the silicate phosphor obtained according to the Comparative Example 2 were checked by the scanning electron microscope (SEM). Then, it was recognized that the Comparative Example 2 showed an uneven shape in which the particles are fused together as the above-described Comparative Example 1, and that the silicate phosphors 2-1 to 2-3 have an uneven particle shape which is approximately the same shape as the particles of the used silicon dioxide (silicon system material) on the contrary. Further, the particle size of the silicate phosphors 2-1 to 2-3 was approximately the same as the particle size of the silicon dioxide used as a raw material. However, the mean particle size of the Comparative Example 2 was increased, and its particle size distribution became broad.

Example 3

With respect to the silicate phosphor 1-1 produced in the Example 1 and the phosphor of the Comparative Example 1, the uniformity of the composition distribution of constituting elements in the particles was evaluated.

The evaluation was made by using a transmission electron microscope (TEM) and by performing determination of the composition in the inside of the particles such that the characteristic X-rays generated from samples when irradiating electron rays were analyzed.

At first, each sample of silicate phosphors was cut out continuously as a slice of 50 nm. Next, the slice was placed on a mesh for electron microscope observation and carbon shadowing was carried out. Then, measurement of characteristic X-rays was performed by using the transmission electron microscope. According to the obtained analysis of the characteristic X-rays, the particle in which the difference of content of Zn, Mn and Si in each slice is not more than 20% of theoretical value of the content of each element was made to be a particle whose composition distribution is microscopically uniform.

The same measurement was made to 100 particles of the silicate phosphors, and the ratio of the particles whose composition distribution is microscopically uniform was calculated. The measurement result is shown in Table 4.

TABLE 4

| SILICATE PHOSPHOR | RATIO OF PARTICLES WHOSE COMPOSITION DISTRIBUTION OF CONSTITUTING ELEMENTS IS UNIFORM [%] |
|---|---|
| PHOSPHOR 1-1 | 85 |
| COMPARATIVE EXAMPLE 1 | 23 |

As shown in Table 4, it is recognized that the composition distribution of constituting elements in the particles of the phosphor 1-1 according to the present invention is extremely uniform.

Example 4

With respect to the silicate phosphor 1-1 produced in the Example 1 and the phosphor of the Comparative Example 1, the contents of constituting elements included in the particles was evaluated.

At first, the composition of every single particle was determined according to relative sensitivity factors by using a secondary ion mass spectrometry (SIMS) apparatus. Next, the inter-particle coefficient of variation of the content of the constituting elements included in the particles was calculated by measuring 100 particles.

In addition, the coefficient of variation was calculated as follows. At first, the composition content when the content of the constituting elements included in each particle was measured was calculated. Then, the standard deviation of the composition content was divided by mean content. Finally the coefficient of variation was calculated by multiplying the divided value by 100. The measurement results are shown in Table 5.

TABLE 5

| SILICATE PHOSPHOR | COEFFICIENT OF VARIATION OF INTER-PARTICLE DISTRIBUTION OF CONTENT OF CONSTITUTING ELEMETNS [%] |
|---|---|
| PHOSPHOR 1-1 | 15.2 |
| COMPARATIVE EXAMPLE 1 | 62.8 |

As shown in Table 5, it is recognized that there is little inter-particle variation of the content of the constituting elements included in the particles of the phosphor 1-1 according to the present invention.

Example 5

A blue phosphor B and a red phosphor R were produced as follows, and PDPs comprising phosphor layers including the phosphors 1-1 to 1-3 produced in the Example 1, the Comparative Example 1, the blue phosphor B and the red phosphor R were produced, and their white brightness was evaluated.

In addition, the phosphors 1-1 to 1-3 and the Comparative Example 1 are green phosphors represented by a composition formula of $Zn_2SiO_4:Mn$, respectively.

1. Production of Phosphors (1) Production of Blue Phosphor B

As raw materials, barium carbonate ($BaCO_3$), magnesium carbonate ($MgCO_3$), aluminum oxide ($\alpha\text{-}Al_2O_3$) were combined in a mole ratio of 1:1:5. Next, a predetermined amount of europium oxide ($Eu_2O_3$) was added in the mixture. Then, the mixture was mixed with a proper amount of flux ($AlF_2$ and $BaCl_2$) in a ball mill, and was calcined in reduction atmosphere of 95% nitrogen and 5% oxygen at 1600° C. for 3 hours to obtain phosphors. The obtained phosphors were classified, and the ones whose mean particle size is 1.5 μm were made to be a blue phosphor B.

(2) Production of Red Phosphor R

As raw materials, yttrium oxide ($Y_2O_3$), gadolinium oxide ($Gd_2O_3$) and boric acid ($H_3BO_3$) were combined so that the atomic ratio of Y, Gd and B becomes 0.60:0.35:1.0. Next, a predetermined amount of europium oxide ($Eu_2O_3$) was added in the mixture. Then, the mixture was mixed with a proper amount of flux in a ball mill, and was calcined in air atmosphere at 1400° C. for 3 hours to obtain silicate phosphors. The obtained phosphors were classified, and the one whose mean particle size is 1.5 μm were made to be a red phosphor R.

2. Preparation of Phosphor Application Composition

Phosphor application compositions B, R and G-1 to G-3 and Comparative Example G were prepared from ethyl cellulose, polyoxyethylene alkylether, and 1:1 mixed liquor of terpineol and pentanediol by using the blue phosphor B and the red phosphor R obtained by the above-described methods, the phosphors 1-1 tol-3 and the Comparative Example 1, respectively.

3. Production of PDP (1) Production of PDP 1

A 42-inch PDP as shown in FIG. 3 was produced as follows by using the blue phosphor application composition B, the red phosphor application composition R and the green phosphor application composition G-3 prepared in the above.

At first, scanning electrodes 51a and sustaining electrodes 51b were formed on a glass substrate, which becomes a front plate 50, according to an inkjet method by using a nozzle having a diameter of 50 μm. At that time, the scanning electrodes 51a and the sustaining electrode 51b having an electrode width of 60 μm were formed respectively by discharging electrode material ink while making the top end of the nozzle scan predetermined positions of the front plate 50 in a state that the distance between the top end of the nozzle and the front plate was kept at 1 mm.

Next, a low-melting glass was printed on the front plate 50 through the electrodes 51, and this was calcined at between 500° C. and 600° C. thereby to form a dielectric layer 52. Moreover, a protective layer 53 was formed by performing electron beam evaporation of MgO.

On the other hand, data electrodes 61 were formed on a glass substrate, which becomes a back plate 60. The data electrodes 61 having a width of 60 μm were formed in the same manner as the above by using a nozzle having a diameter of 50 μm and keeping the distance between the back plate 60 and the top end of the nozzle at 1 mm and scanning predetermined positions of the back plate. Next, stripe-like partition walls 70 were formed by using a low-melting glass so as to be located in both sides of the data electrodes. The distance (pitch) between the adjacent partition walls 70 was made to be 0.36 mm, and the height of the partition walls 70 were made to be 0.15 mm.

Furthermore, the phosphor application compositions B, R and G-1 prepared in the above-described section No. 2 were applied to the bottom face 71a facing the inside of cells 71 divided by the above-described partition walls 70 and to the side face 70a of the partition walls 70. The application liquids B, R and G-1 were applied to the adjacent cells one by one in a regular order.

Then, the front plate 50 and the above-described back plate 60 in which the electrodes 51 and 61 and the like were arranged respectively were aligned so that each electrode arranged face would be faced to each other. Thereafter, the periphery of the substrates 50 and 60 were sealed with a seal glass in a state of keeping a gap of approximately 1 mm by the partition walls 70. Then, a gas in which Xenon (Xe) for generating ultraviolet rays by discharging was mixed with Neon (Ne) as a main discharge gas was charged in between the substrates 50 and 60, and they were sealed up tightly. In addition, the mixing volume ratio of Xenon and Neon was 1:9, and the charged pressure was 66.7 mPa. Thereafter, aging was performed to obtain a PDP 1.

(2) Production of PDP 2

A PDP was produced to obtain PDP 2 in the same manner as the PDP 1 except that the G-2 was used as a green phosphor application composition.

(3) Production of PDP 3

A PDP was produced to obtain PDP 3 in the same manner as the PDP 1 except that the G-3 was used as a green phosphor application composition.

(4) Production of Comparative Example 3

A PDP was produced to obtain the Comparative Example 3 in the same manner as the PDP 1 except that the Comparative Example G was used as a green phosphor application composition.

4. Evaluation

With respect to the PDPs 1 to 3 and the Comparative Example G obtained in the above, the brightness when they were driven at a discharge sustaining voltage at the time of lightening the whole surface of the panels and at frequency of 30 kHz was measured, and was shown as a relative value by using the panel brightness of the Comparative Example 3 as 100. The evaluation results are shown in Table 6.

TABLE 6

| PDP | GREEN PHOSPHOR | PANEL BRIGHTNESS |
| --- | --- | --- |
| PDP 1 | PHOSPHOR 1-1 | 138 |
| PDP 2 | PHOSPHOR 1-2 | 143 |
| PDP 3 | PHOSPHOR 1-3 | 141 |
| COMPARATIVE EXAMPLE 3 | COMPARATIVE EXAMPLE 1 | 100 |

As shown in Table 6, compared with the case of forming a green phosphor layer by using the phosphor produced by the Comparative Example 1, it was recognized that the panel brightness of the PDP in which the green phosphor layer was formed by using each of the phosphors 1-1 to 1-3 according to the present invention improves.

Further, confirming visually, compared with the panel of the Comparative Example 3, the PDPs 1 to 3 did not have luminescence unevenness and the like, and could display images beautifully.

Example 6

In the Example 6, phosphors 3-1 to 3-7 and a Comparative Example 4 represented by a formula of $Zn_2SiO_4$:Mn were produced, and the luminescence intensity, persistence time and particle shape of each phosphor were evaluated.

In addition, as for the phosphors 3-1 to 3-7, silicon dioxed (SiO$_2$) was used as a silicon system material, and a silicon system liquid material in which the silicon dioxide was dispersed in water or ethanol was mixed with a metal system liquid material or the like to produce Zn$_2$SiO$_4$:Mn.

On the other hand, as for the phosphor of the Comparative Example 4, sodium metasilicate (Na$_2$SiO$_3$) was used instead of the silicon dioxide, and a sodium metasilicate solution in which the sodium metasilicate was dissolved in pure water was mixed with a metal system liquid material to produce a phosphor.

1. Production of Phosphors

At first, production of phosphors 3-1 to 3-7 will be explained.

(1) Production of Phosphor 3-1

At first, liquid A was prepared by mixing 4.51 g of silicon dioxide (AEROSIL 200 produced by Nippon Aerosil Co., Ltd., BET specific surface area of 200 m$^2$/g) with 235.38 g of ethanol. At the same time, liquid B was prepared by dissolving 42.39 g of zinc nitrate hexahydrate and 2.15 g of manganese nitrate hexahydrate in 101.91 g of ethanol. Furthermore, liquid C was prepared by dissolving 22.69 g of oxalic acid dihydrate in 106.14 g of ethanol.

Next, by using the reactor 100 shown in FIG. 5, the liquid B and the liquid C were added simultaneously according to double jet in the surface of the liquid A at an addition rate of 10 cc/min by using the roller pumps 110 while agitating the liquid A at room temperature. After the liquid B and the liquid C were added, the mixed liquid was agitated for a few minutes (that is, the time that the reaction promotes sufficiently), and thereafter, the reacted material was washed sufficiently by using ethanol while performing solid-liquid separation according to suction filtration. Then, drying was performed at 100° C. for 12 hours, and a dried precursor was obtained. Then, the obtained precursor was calcined in 100% nitrogen atmosphere at 1200° C. for 3 hours, and a phosphor 3-1 was obtained.

(2) Production of Phosphor 3-2

At first, liquid A was prepared by mixing 4.51 g of silicon dioxide (AEROSIL 200 produced by Nippon Aerosil Co., Ltd., BET specific surface area of 200 m$^2$/g) with 297.95 g of pure water. At the same time, liquid B was prepared by dissolving 42.39 g of zinc nitrate hexahydrate and 2.15 g of manganese nitrate hexahydrate in 126.84 g of pure water. Furthermore, liquid C was prepared by mixing 21.90 g of aqueous ammonia (28%) with 125.67 g of pure water.

Next, by using the reactor 100 shown in FIG. 5 similarly to the above-described (1), the liquid B and the liquid C were added simultaneously according to double jet in the surface of the liquid A at an addition rate of 10 cc/min by using the roller pumps 110 while agitating the liquid A at 40° C. After the liquid B and the liquid C were added, the mixed liquid was agitated for a few minutes, and thereafter, the reacted material was washed sufficiently by using pure water while performing solid-liquid separation according to suction filtration. Then, drying was performed at 100° C. for 12 hours, and a dried precursor was obtained. Then, the obtained precursor was calcined in 100% nitrogen atmosphere at 1200° C. for 3 hours, and a phosphor 3-2 was obtained.

(3) Production of Phosphor 3-3

A phosphor 3-3 was produced in the same manner as the phosphor 3-1 in the above-described (1) except that the liquid A was prepared beforehand by performing ultrasonic dispersion for 10 minutes while keeping the liquid A at not more than 20° C.

(4) Production of Phosphor 3-4

A phosphor 3-4 was produced in the same manner as the phosphor 3-2 in the above-described (2) except that the liquid A was prepared beforehand by performing ultrasonic dispersion for 10 minutes while keeping the liquid A at not more than 20° C.

(5) Production of Phosphor 3-5

A phosphor 3-3 was obtained in the same manner as the phosphor 3-2 in the above-described (2) except that the liquid A was prepared beforehand by mixing 4.51 g of silicon dioxide (AEROSIL 200 produced by Nippon Aerosil Co., Ltd., BET specific surface area of 200 m$^2$/g) and 0.06 g of dispersant (SD-10 produced by Toagosei Co., Ltd., 40 wt %) with 297.90 g of pure water and agitating it for 10 minutes. Here, the dispersant was polyacrylic acid hydroxyalkyl.

(6) Production of Phosphor 3-6

A phosphor 3-6 was obtained in the same manner as the phosphor 3-2 in the above-described (2) except that the liquid A was prepared by mixing 15.02 g of colloidal silica (KLEBOSOL30R25 produced by Clariant KK, 30 wt %) with 287.38 g of pure water.

(7) Production of Phosphor 3-7

A phosphor 3-7 was obtained in the same manner as the phosphor 3-2 in the above-described (2) except that calcining of the precursor was performed in air atmosphere at 1200° C. for 3 hours, and moreover, in reducing atmosphere of 95% nitrogen and 5% oxygen at 800° C. for 1 hour.

(8) Production of Comparative Example 4

Next, a method for producing a phosphor used as the Comparative Example 4 will be explained.

At first, the one in which only 300 g of water is weighted was used as liquid A.

Next, liquid B was prepared by dissolving 42.39 g of zinc nitrate hexahydrate and 2.15 g of manganese nitrate hexanydrate in 126.84 g of pure water. Further, liquid C was prepared by dissolving 9.15 g of sodium metasilicate in 149.02 g of pure water.

Similarly to the above-described (1) to (7), by using the reactor 100 shown in FIG. 5, the liquid B and the liquid C were added simultaneously according to double jet in the surface of the liquid A at an addition rate of 10 cc/min by using the roller pumps 110 while agitating the liquid A at 40° C. After the liquid B and the liquid C were added, the mixed liquid was agitated for a few minutes, and thereafter, the reacted material was washed sufficiently by using pure water while performing solid-liquid separation according to suction filtration. Then, drying was performed at 100° C. for 12 hours, and a dried precursor was obtained. Then, the obtained precursor was calcined in 100% nitrogen atmosphere at 1200° C. for 3 hours, and a phosphor was obtained.

2. Evaluation

With respect to the phosphors 3-1 to 3-7 obtained in the above-described (1) to (7) and the phosphor of the Comparative Example 4 obtained in the above-described (8), their luminescence intensity, persistence time and particle shape were evaluated.

At first, the luminescence intensity will be explained.

(1) Evaluation of Luminescence Intensity

Ultraviolet rays were irradiated to the phosphors 3-1 to 3-7 and the phosphor obtained by the Comparative Example 4, respectively, in a vacuum chamber of 0.1 to 1.5 Pa by using an excimer 146 nm lamp (produced by Ushio INC.), and green lights were emitted from the phosphors. Next, the intensity of each of the obtained green lights was measured by using a detector (MCPD-3000 (produced by Otsuka Electronics Co., Ltd.)) Then, the peak intensity of emission was calculated with a relative value by using the phosphor obtained by the Comparative Example 4 as 100. The obtained results are shown in Table 7.

TABLE 7

| SILICATE PHOSPHOR | RELATIVE LUMINESCENCE INTENSITY [%] |
|---|---|
| PHOSPHOR 3-1 | 124 |
| PHOSPHOR 3-2 | 121 |
| PHOSPHOR 3-3 | 131 |
| PHOSPHOR 3-4 | 128 |
| PHOSPHOR 3-5 | 126 |
| PHOSPHOR 3-6 | 130 |
| PHOSPHOR 3-7 | 123 |
| COMPARATIVE EXAMPLE 4 | 100 |

As shown in Table 7, compared with the Comparative Example 4, the luminescent intensity of the phosphors 3-1 to 3-7 becomes high for 21% to 31%, so that phosphors having high luminescence intensity can be obtained by producing the phosphors by the method for producing phosphors according to the present invention.

Here, as for the producing conditions of the phosphors, in the Comparative Example 4, pure water was used as the liquid A as mother liquid. Then, the precursor was formed by adding and mixing a sodium metasilicate solution, in which sodium metasilicate was dissolved in pure water, and the metal system liquid material into this liquid A. Thereafter, the precursor was calcined to obtain $Zn_2SiO_4$:Mn. On the other hand, in the phosphors 3-1 to 3-7, the silicon system liquid material in which silicon dioxide was dissolved in ethanol or pure water was used as liquid A. The precursor was formed by adding and mixing the metal system liquid material into this liquid A. Then, the precursor was calcined to obtain $Zn_2SiO_4$:Mn.

Thus, although its clear reason is not known exactly, the ratio of zinc and manganese to silicon becomes more uniform by forming a precursor in a state that a silicon system material is dispersed in a liquid, and thereby, it can be considered that the luminescence intensity can be improved.

Next, the relation between with or without beforehand-preparation of liquid A and the relative luminescence intensity will be discussed.

At first, the phosphor 3-1 and the phosphor 3-3 that are produced in the same conditions except for with or without beforehand-preparation of liquid A is discussed. Here, the phosphor 3-3 was obtained by preparing the liquid A beforehand by performing ultrasonic dispersion for 10 minutes. As shown in Table 7, the relative luminescence intensity of the phosphor 3-1 was 124, on the contrary, the relative luminescence intensity of the phosphor 3-3 was 131. Therefore, it can be realized that the relative luminescence intensity will further improve by performing ultrasonic dispersion of liquid A for 10 minutes.

The same thing can be said by comparing the relative luminescence intensity of the phosphor 3-2 and the phosphor 3-4. The producing conditions of the phosphor 3-4 is the same as the producing conditions of the phosphor 3-2 except that the liquid A was prepared beforehand by performing ultrasonic dispersion for 10 minutes. As shown in Table 7, the relative luminescence intensity of the phosphor 3-2 was 121, on the contrary, the relative luminescence intensity of the phosphor 3-4 was 128. Thereby, as the same as in the above, it can be realized that the relative luminescence intensity will improve by preparing the liquid A beforehand when producing a phosphor.

Next, the relation between the method of preparing liquid A beforehand and the relative luminescence intensity will be discussed. The producing conditions of the phosphors 3-4 to 3-6 were the same except that the methods of producing the liquid A were different. The phosphor 3-4 was obtained by preparing the liquid A beforehand by performing ultrasonic dispersion for 10 minutes as described above. The phosphor 3-5 was obtained by preparing the liquid A by agitating it with a dispersant for 10 minutes. The phosphor 3-6 was obtained by preparing the liquid A by mixing colloidal silica, in which the dispersion state of silicon dioxide was prepared beforehand, with pure water.

As a result, the luminescence intensities of the phosphor 3-4, the phosphor 3-5 and the phosphor 3-6 were 128, 126 and 130, respectively.

Accordingly, it can be said that the luminescence intensities of the phosphors 3-4 to 3-6 were approximately the same. However, dispersing silicon dioxide in liquid (pure water in this case) by performing ultrasonic dispersion as the phosphor 3-4, or using colloidal silica, in which the dispersion state is prepared beforehand, as the phosphor 3-6 is more preferable than adding and agitating a dispersant in the liquid A as the phosphor 3-5, when preparing the liquid A.

Next, the relation between the solvent used in liquid A and the relative luminescence intensity will be discussed.

In here, the phosphor 3-1, the phosphor 3-2, the phosphor 3-3 and the phosphor 3-4 that were produced under the same producing conditions except for difference in solvents will be compared. The phosphor 3-1 and the phosphor 3-3 used ethanol as solvent of liquid A. The phosphor 3-2 and the phosphor 3-4 used pure water as solvent of liquid A.

As shown in Table 7, the luminescence intensities of the phosphor 3-1 and the phosphor 3-3 were 124 and 131, respectively. On the other hand, the luminescence intensities of the phosphor 3-2 and the phosphor 3-4 were 121 and 128, respectively. Therefore, in case of using approximately the same producing conditions, it becomes possible to disperse silicon dioxide better when using ethanol as a solvent. As a result, the luminescence intensity of a phosphor can be improved.

Furthermore, the relation between the calcining conditions and the luminescence intensity will be discussed. The producing conditions of the phosphor 3-2 and the phosphor 3-7 were approximately the same. However, the phosphor 3-2 was obtained by calcining in nitrogen atmosphere at 1200° C. for 3 hours, on the contrary, the phosphor 3-7 was obtained by calcining in reducing atmosphere of 95% nitrogen and 5% oxygen at 800° C. for 1 hour after calcining in air atmosphere at 1200° C. for 3 hours. As a result, the relative luminescence intensity of the phosphor 3-2 was 121, on the contrary, that of the phosphor 3-7 was 123, which were approximately the same.

(2) Evaluation of Persistence Time

Next, the persistence times of the phosphors 3-1 to 3-7 and the phosphor of the Comparative Example 4 were measured by using fluorescence lifetime spectrometers, respectively. The persistence time was made to be the time such that the luminescent intensity after shielding exciting lights becomes $1/10$ of the luminescence intensity just before the shielding, and was shown in a relative value by using the phosphor obtained in the Comparative Example 4 as 100. The results are shown in Table 8.

TABLE 8

| SILICATE PHOSPHOR | RELATIVE PERSISTENCE TIME |
|---|---|
| PHOSPHOR 3-1 | 53 |
| PHOSPHOR 3-2 | 57 |
| PHOSPHOR 3-3 | 45 |
| PHOSPHOR 3-4 | 47 |
| PHOSPHOR 3-5 | 51 |
| PHOSPHOR 3-6 | 46 |
| PHOSPHOR 3-7 | 56 |
| COMPARATIVE EXAMPLE 4 | 100 |

As shown in Table 8, as for the phosphors 3-1 to 3-7, it can be realized that the persistence time of any of them shows approximately half value to the phosphor obtained in the Comparative Example 4. According to this result, similarly to the case of the luminescence intensity, it can be considered that the persistence time can be made short by forming a precursor in a state that a silicon system material is dispersed in a liquid and calcining and by forming $SiO_2$ solid solution in the inside of a phosphor.

Here, similar to the case of evaluation of the luminescence intensity, the relation between the beforehand-preparation of liquid A and the persistence time will be discussed. The relative persistence time of the phosphor 3-1, in which the liquid A was not prepared beforehand, was 53, on the contrary, the relative persistence time of the phosphor 3-3, in which the liquid A was prepared beforehand by performing ultrasonic dispersion for 10 minutes, was 45.

Further, with respect to the phosphor 3-2 and the phosphor 3-4, the relative persistence time of the phosphor 3-2, in which the liquid A was not prepared beforehand, was 57, on the contrary, the relative persistence time of the phosphor 3-4, in which the liquid A was prepared beforehand by performing ultrasonic dispersion for 10 minutes, was 47.

Accordingly, similar to the case of the luminescence intensity, the persistence time can be made shorter by preparing liquid A beforehand and making the dispersion state of the silicon dioxide in the liquid A in a desired state when producing a phosphor.

Next, the relation between the method when preparing liquid A beforehand and the persistence time will be discussed. The phosphor 3-4, the phosphor 3-5 and the phosphor 3-6 had approximately the same production conditions except that the methods of preparing liquid A were different, as mentioned above.

As shown in Table 8, the persistence times of the phosphor 3-4, the phosphor 3-5 and the phosphor 3-6 were 47, 51 and 46, respectively. Accordingly, with respect to the persistence time, it is also preferable to prepare the liquid A by performing ultrasonic dispersion or by using colloidal silica rather than preparing the liquid A by agitating it, and the persistence time can be made short.

Next, the relation between the solvent of the liquid A and the persistence time will be discussed. Comparing the phosphor 3-1, the phosphor 3-2, the phosphor 3-3 and the phosphor 3-4, the relative persistence times of the phosphor 3-1 and the phosphor 3-3, in which ethanol was used as the solvent of liquid A, were 53 and 45, respectively. On the other hand, the relative persistence times of the phosphor 3-2 and the phosphor 3-4, in which water was used as the solvent of liquid A, were 57 and 47, respectively. Accordingly, in case of approximately the same production conditions, the dispersion state of silicon dioxide becomes well by using ethanol as the solvent, so that a phosphor having shorter persistence time can be obtained.

Furthermore, the relation between the calcining conditions and the persistence time will be discussed. Similar to the case of evaluation of the luminescence intensity, comparing the phosphor 3-2 with the phosphor 3-7, the relative persistence times of them were 57 and 56, respectively, which were approximately the same.

According to the evaluation results of the luminescence intensity and the persistence time in the above, a phosphor having excellent luminescence brightness under excitation by ultraviolet rays and having a short persistence time can be obtained by producing a silicate phosphor according to the method for producing a phosphor of the present invention. Accordingly, the brightness of various device displays such as PDP and the like can be improved by using the phosphor produced by the method for producing the phosphor of the present invention. Further, since the persistence time is short, moving images and the like can be displayed smoothly.

(3) Evaluation of Particle Shape

Next, the particle shapes of the phosphor 3-1 obtained in the above-described (1) and the phosphor obtained by the Comparative Example 4 were evaluated by using the scanning electron microscope (SEM).

The evaluation was performed as follows. At first, 1000 particles were selected randomly. Then, the direction connecting arbitrary two points a and b on the surface of particles was made to be a major axis so that the distance between the two points a and b becomes maximum, and the axis perpendicular to the major axis direction was made to be a minor axis. Then, the ratio (R) of the particles (SS) having a shape such that variations of the length of the minor axis in the major axis direction have at least two maximal values was calculated. Next, the major axis diameter (L), the maximal value of the minor axis diameter (Smax) and the minimal value of the minor axis diameter (Smin) were measured, and the values of L, L/Smax and Smax/Smin were calculated and shown in mean values, respectively. The evaluation results are shown in Table 9 together with monodisperse degree (coefficient of variation of particle size distribution). Further, a SEM photograph of the phosphor 3-1 is shown in FIG. 1.

TABLE 9

| PHOSPHOR | R [%] | L [μm] | L/Smax | Smax/Smin | DEGREE OF MONODIS-PERSE [%] |
|---|---|---|---|---|---|
| PHOSPHOR 3-1 | 85 | 0.6 | 2.4 | 1.6 | 35 |
| COMPARATIVE EXAMPLE 4 | 0 | 1.0 | — | — | 38 |

According to Table 9, the followings can be realized. At first, the particles having a specific shape, SS, in the phosphor 3-1 were made up 85% of the whole. On the contrary, in the phosphor obtained by the Comparative Example 4, no particles having such a shape was obtained. Therefore, it is realized that a phosphor having a specific shape peculiar to the present invention as shown in FIG. 1 can be obtained by producing the phosphor according to the method shown in the above-described (1).

In the above, the embodiments and Examples of the present invention are explained. However, it is needless to say that the present invention is not limited to such embodiments or Examples, but various modifications are possible in a range within the scope of the present invention.

The entire disclosure of Japanese Patent Application Nos. 2002-215026 and 2003-036971 filed on Jul. 24, 2002, and Feb. 14, 2003, including specification, claims, drawings and summary are incorporated herein by reference in its entirety.

What is claimed is:

1. A method for producing a silicate phosphor, comprising the steps of:

forming the precursor of the phosphor by mixing a first liquid dispersion of wet silica with a second liquid containing a metallic element; and calcining the precursor, wherein the calcining includes the steps of, a first calcining of the precursor such that any fusion of the wet silica is insubstantial, mixing a sintering inhibitor in a calcined product obtained in the first calcining, and a second calcining comprising calcining the calcined product obtained in the first calcining.

2. The method of claim 1, wherein the wet silica is colloidal silica.

3. The method of claim 1, wherein a BET specific surface area of the wet silica is not less than 50 $m^2/g$.

4. The method of claim 1, wherein the metallic element is selected from the group consisting of Zn, Mn, Mg, Ca, Sr, Ba, Y, Zr, Al, Ga, La, Ce, Eu and Tb.

5. The method of claim 1, wherein in the precursor forming step, a solution including a precipitant which forms a precipitate by reacting with the metallic element is mixed.

6. The method of claim 5, wherein the precipitant is organic acid or alkali hydroxide.

7. The method of claim 1, wherein the wet silica is prepared beforehand.

8. The method of claim 1, wherein the first liquid is water, alcohol(s), or a mixture of water and alcohol(s).

9. The method of claim 1, wherein the second liquid is water, alcohol(s), or a mixture of water and alcohol(s).

* * * * *